US010275025B2

(12) United States Patent
Black et al.

(10) Patent No.: US 10,275,025 B2
(45) Date of Patent: Apr. 30, 2019

(54) GLOVES THAT INCLUDE HAPTIC FEEDBACK FOR USE WITH HMD SYSTEMS

(71) Applicant: Sony Interactive Entertainment Inc., Tokyo (JP)

(72) Inventors: Glenn Black, San Mateo, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 55 days.

(21) Appl. No.: 15/181,257

(22) Filed: Jun. 13, 2016

(65) Prior Publication Data

US 2016/0363997 A1    Dec. 15, 2016

Related U.S. Application Data

(60) Provisional application No. 62/175,279, filed on Jun. 14, 2015.

(51) Int. Cl.
*G06F 3/01*      (2006.01)

(52) U.S. Cl.
CPC .............. *G06F 3/014* (2013.01); *G06F 3/016* (2013.01)

(58) Field of Classification Search
CPC .................................. G06F 3/014; G06F 3/016
See application file for complete search history.

(56) References Cited

U.S. PATENT DOCUMENTS

| 2012/0182135 A1* | 7/2012 | Kusuura ................... G06F 3/00 340/407.1 |
| 2012/0299905 A1* | 11/2012 | Roselier .................. F15B 15/00 345/214 |
| 2014/0337724 A1* | 11/2014 | Tremblay ................ G06F 3/011 715/701 |
| 2016/0274662 A1* | 9/2016 | Rimon ..................... G06F 3/014 |
| 2017/0131773 A1* | 5/2017 | Keller ...................... G06F 3/016 |

FOREIGN PATENT DOCUMENTS

| GB | 2 263 179 A | 7/1993 |
| WO | 01/18617 A1 | 3/2001 |

OTHER PUBLICATIONS

Scott H. Winter et al.: "Use of Magnetorheological Fluid in a Force Feedback Glove", IEEE Transactions on Neural Systems and RehabilitationEngineering, IEEE Service Center, New York, NY, US, vol. 15, No. 1, Mar. 1, 2007 (Mar. 1, 2007), pp. 2-8, XP011174741, ISSN: 1534-4320, DOI: 10.1109/TNSRE.2007.891401, the whole document (Abstract only provided).

(Continued)

*Primary Examiner* — Liliana Cerullo
(74) *Attorney, Agent, or Firm* — Penilla IP, APC

(57) ABSTRACT

A glove interface object is provided, comprising: a plurality of fluid channels disposed on a palmar side of the glove interface object, the fluid channels containing a magnetic fluid; a plurality of electromagnets positioned on the palmar side of the glove interface object, each of the plurality of electromagnets being configured when activated to generate a magnetic field that acts on at least a portion of the magnetic fluid; a controller configured to control activation and deactivation of the electromagnets based on received haptic feedback data.

17 Claims, 23 Drawing Sheets

(56) References Cited

OTHER PUBLICATIONS

J. Blake et al: "Haptic Glove with MR Brakes for Virtual Reality", IEEE / ASME Transactions on Mechatronics, IEEE Service Center, Piscataway, NJ, US, vol. 14, No. 5, Oct. 5, 2009 (Oct. 5, 2009), pp. 606-615, XP011345296, ISSN: 1083-4435, DOI: 10.1109/TMECH. 2008.2010934, the whole document (Abstract only provided).
Notification of Transmittal of the International Search Report and the Written Opinion of the International Searching Authority, issued in International Application No. PCT/US2016/037284, dated Sep. 6, 2016 (15 total pages).

\* cited by examiner

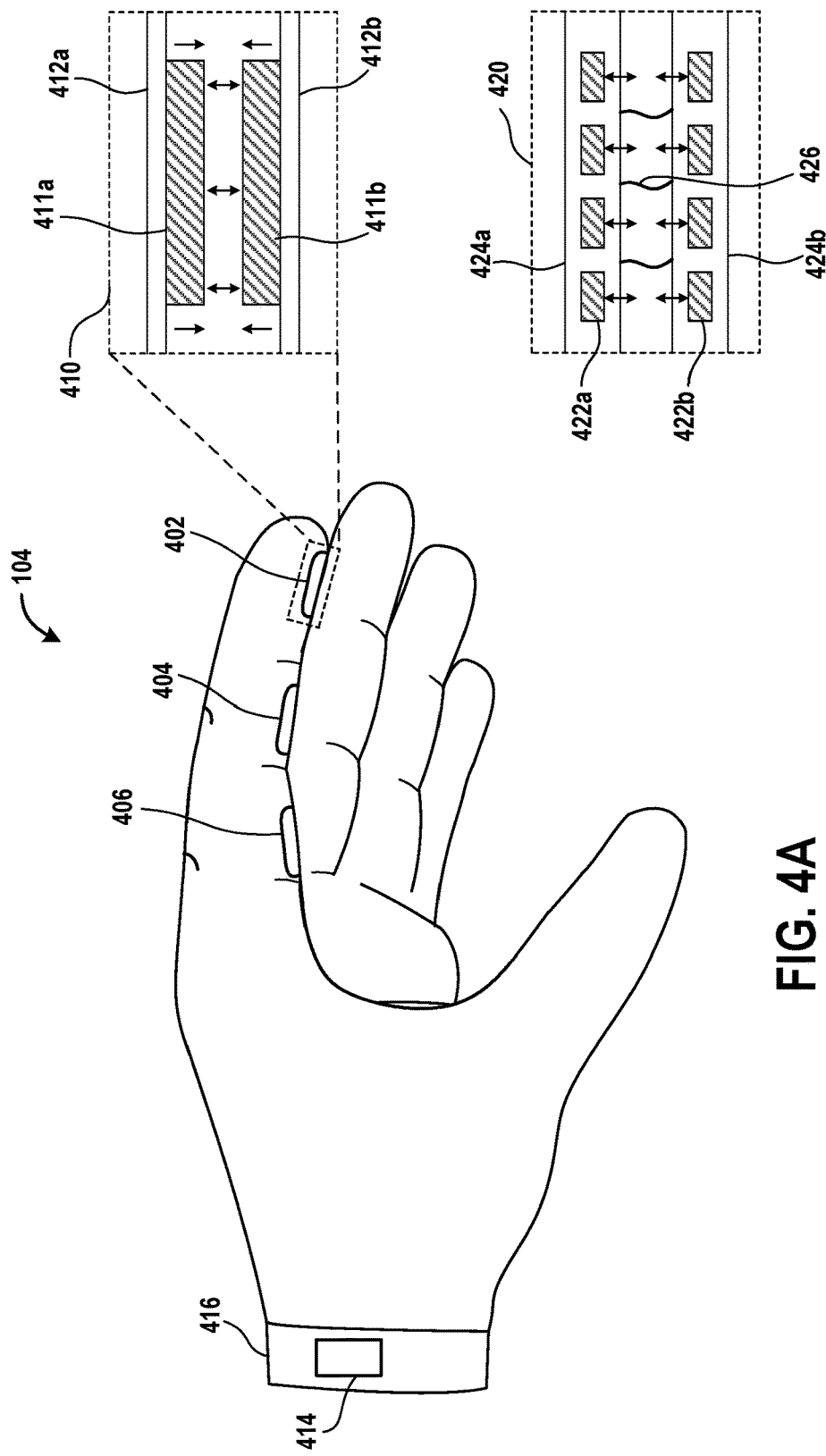

GLOVES THAT INCLUDE HAPTIC FEEDBACK FOR USE WITH HMD SYSTEMS

CLAIM OF PRIORITY

This application claims priority to U.S. Provisional Application No. 62/175,279, filed Jun. 14, 2015, entitled "Gloves that Include Haptic Feedback for Use with HMD Systems," the disclosure of which is incorporated by reference herein.

RELATED APPLICATIONS

This application is related to U.S. application Ser. No. 14/517,741, filed Oct. 17, 2014, entitled "Glove Interface Object," and to U.S. application Ser. No. 14/517,733, filed Oct. 17, 2014, entitled "Thumb Controller," and to U.S. application Ser. No. 14/717,915, filed May 20, 2015, entitled "Electromagnet-laden Glove for Haptic Feedback," the disclosures of which are incorporated by reference herein.

BACKGROUND

1. Field of the Invention

The present invention relates to gloves that include haptic feedback for use with HMD systems, and associated apparatus and methods.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide for gloves that include haptic feedback for use with HMD systems, and associated methods, apparatus and systems.

Implementations of the present disclosure provide ways for utilizing gloves that may include magnetic material. This magnetic material allows for controllably causing selected fingers to come together or all fingers to join together or fingers to repel one another or repel and attract. For instance, when a user grabs a virtual object, the virtual object may appear to be in the user's hand because of the repelling forces in the magnetic fields of the fingers or the hand. If the user grabs an item in the virtual environment that appears to be soft, the hand may be compressed together to give the feeling of softness. In still other embodiments, micro fluid can be disbursed within the glove to allow stiffening of the glove or softening of the glove depending on the interaction with virtual environment items, as viewed and interacted with via the HMD. In some embodiments, the rates of compression, the rates of stiffening, and the rates of attraction can be dynamically set depending on the environment. In still further embodiments, two hands can be caused to clamp together or two hands can be caused to repel each other. In further embodiments, the gloves can have air pockets that can expand or collapse and can work together with the magnetic material. In still other embodiments, magnetic fluid can be used to allow various feedback mechanisms that are possible with magnetic materials and also with fluid materials. In each embodiment, the feedback provided to the gloves is synchronized with the content being displayed via the virtual environment of the HMD.

Other aspects of the invention will become apparent from the following detailed description, taken in conjunction with the accompanying drawings, illustrating by way of example the principles of the invention.

BRIEF DESCRIPTION OF THE DRAWINGS

The invention may be better understood by reference to the following description taken in conjunction with the accompanying drawings in which:

FIG. 4A illustrates a glove interface object for providing haptic feedback, in accordance with an embodiment of the invention.

DETAILED DESCRIPTION

Figure 1:
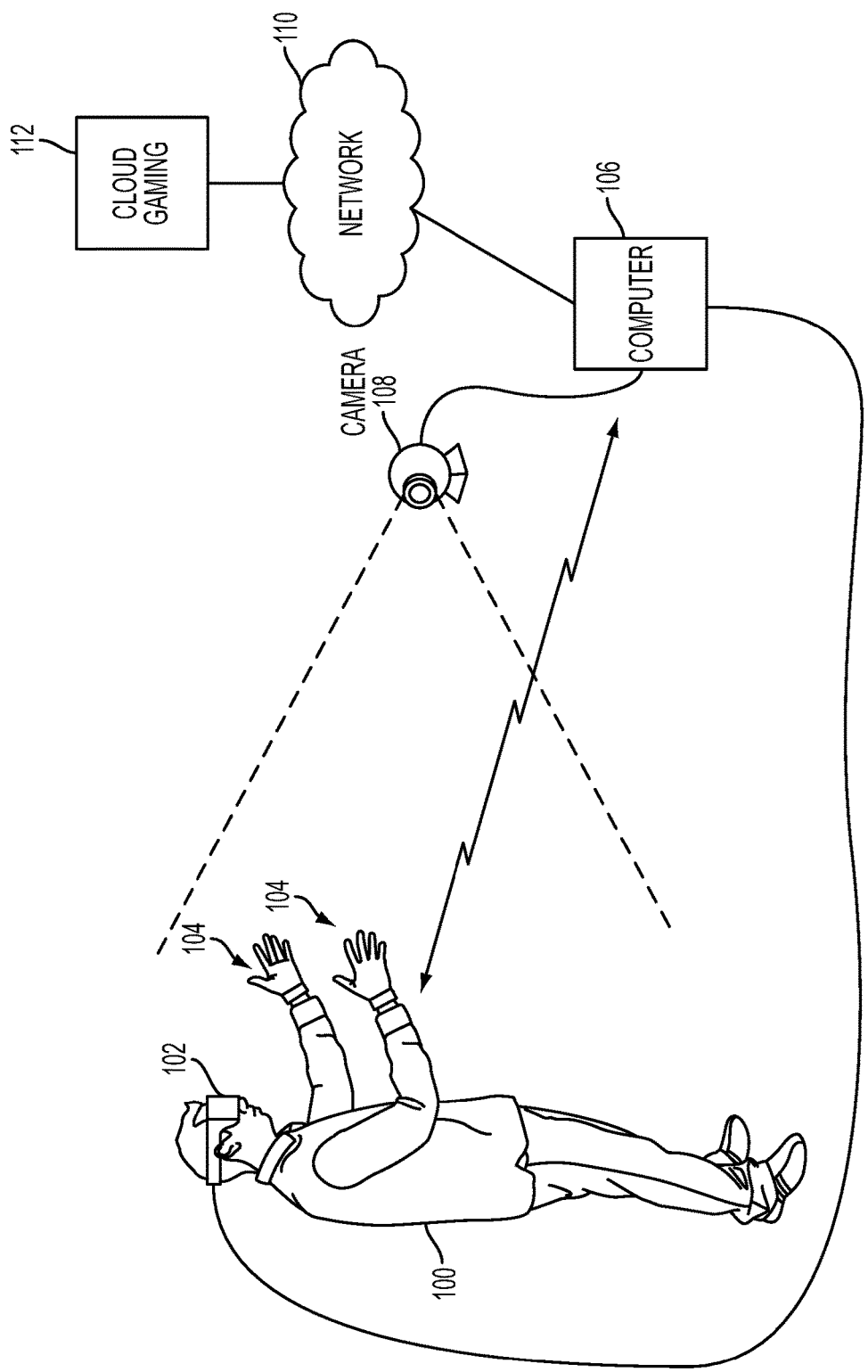
FIG. 1 illustrates a system for interactive gameplay of a video game, in accordance with an embodiment of the invention.

The following embodiments provide a glove interface object and associated systems, methods, and apparatuses.

In one embodiment, the methods, systems, image capture objects, sensors and associated interfaces objects (e.g., gloves) are configured to process data that is configured to be rendered in substantial real time on a display screen. For example, when a user's hand changes positions (e.g., the hand moves, fingers bend, multiple fingers bend, fingers touch other fingers and/or gestures are made), the changes in positions are configured to be displayed in substantial real time on a display.

The display may be the display of a head mounted display (HMD), a display of a second screen, a display of a portable device, a computer display, a display panel, a display of a remotely connected users (e.g., whom may be viewing content or sharing in an interactive experience), or the like. In some embodiments, the captured positions of the user's hand, the pressures sensed, the fingers touched, and/or the hand/finger gestures are used to interact in a video game, in a virtual world scene, a shared virtual space, a video game character, a character that is an extension of the real-world user, or simply provide a way of touching, holding, playing, interfacing or contacting virtual objects shown on a display screen or objects associated with documents, text, images, and the like.

In still other embodiments, virtual gloves may be worn by multiple users in a multi-user game. In such examples, each user may use one or two gloves. The users may be co-located or interfacing in a shared space or shared game from remote locations using a cloud gaming system, networked device and/or social networked collaboration space. In some embodiments, a glove may be used by one or more remote users to interact in a collaborative way to examine documents, screens, applications, diagrams, business information, or the like. In such an implementation, users collaborating may use their gloves to touch objects, move objects, interface with surfaces, press on objects, squeeze objects, toss objects, make gesture actions or motions, or the like.

During collaboration, movements made by one user's hand can appear to the other user as if a real user hand is moving things, objects, or making actions in the collaboration space. Still in a collaboration environment, if two remote users are examining documents, users wearing gloves can point at things on a virtual page, point and draw on a virtual whiteboard, lift and move virtual papers, shake hands, move items, etc. In some collaborative environments, one or more of the users may be wearing an HMD. When the HMD is used in conjunction with the glove or gloves (e.g., worn by one or more users), the users may see a virtual environment in which they can collaborate using their hands, such as moving objects, pages, objects, typing on virtual keyboards, moving virtual pages, tapping on things, pressing on things, etc.

Therefore, it should be understood that the uses of a glove that includes one or more sensors, and/or can detect pressure, and/or can detect bending position of fingers, and/or can detect orientation, and/or can detect inertial movement, etc., can provide for a broad scope of uses. Example uses, without limitation, may include video gaming, entertainment activities, sport related activities, travel and exploring related activities, human-to-human contact (e.g., shaking hands of a remote user), business activities, robotic control (e.g. robotic surgery), etc. In one implementation, this type of interactivity provided by a glove interface may be extended to additional sensors that may be attached or associated with other parts of the human body (e.g., an arm, a leg, a foot, etc.). In addition to gloves, different types of clothes are envisioned, e.g., jackets, pants, shoes, hats, etc.

It will be obvious, however, to one skilled in the art, that the present invention may be practiced without some or all of these specific details. In other instances, well known process operations have not been described in detail in order not to unnecessarily obscure the present invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture images of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, glove interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
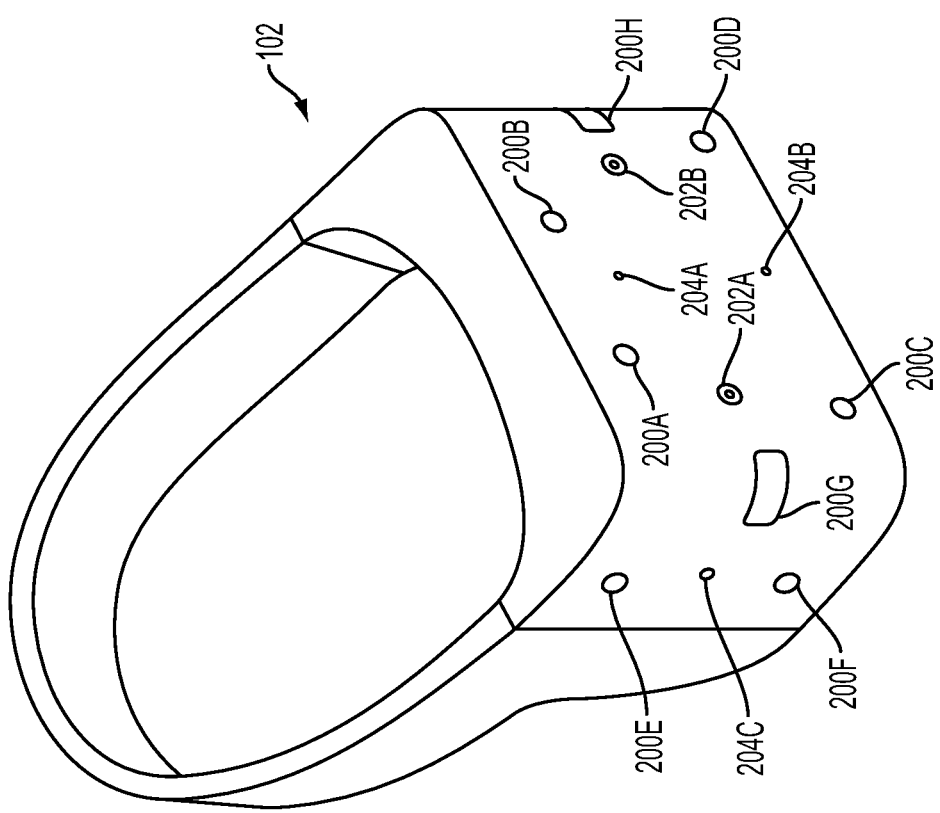
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
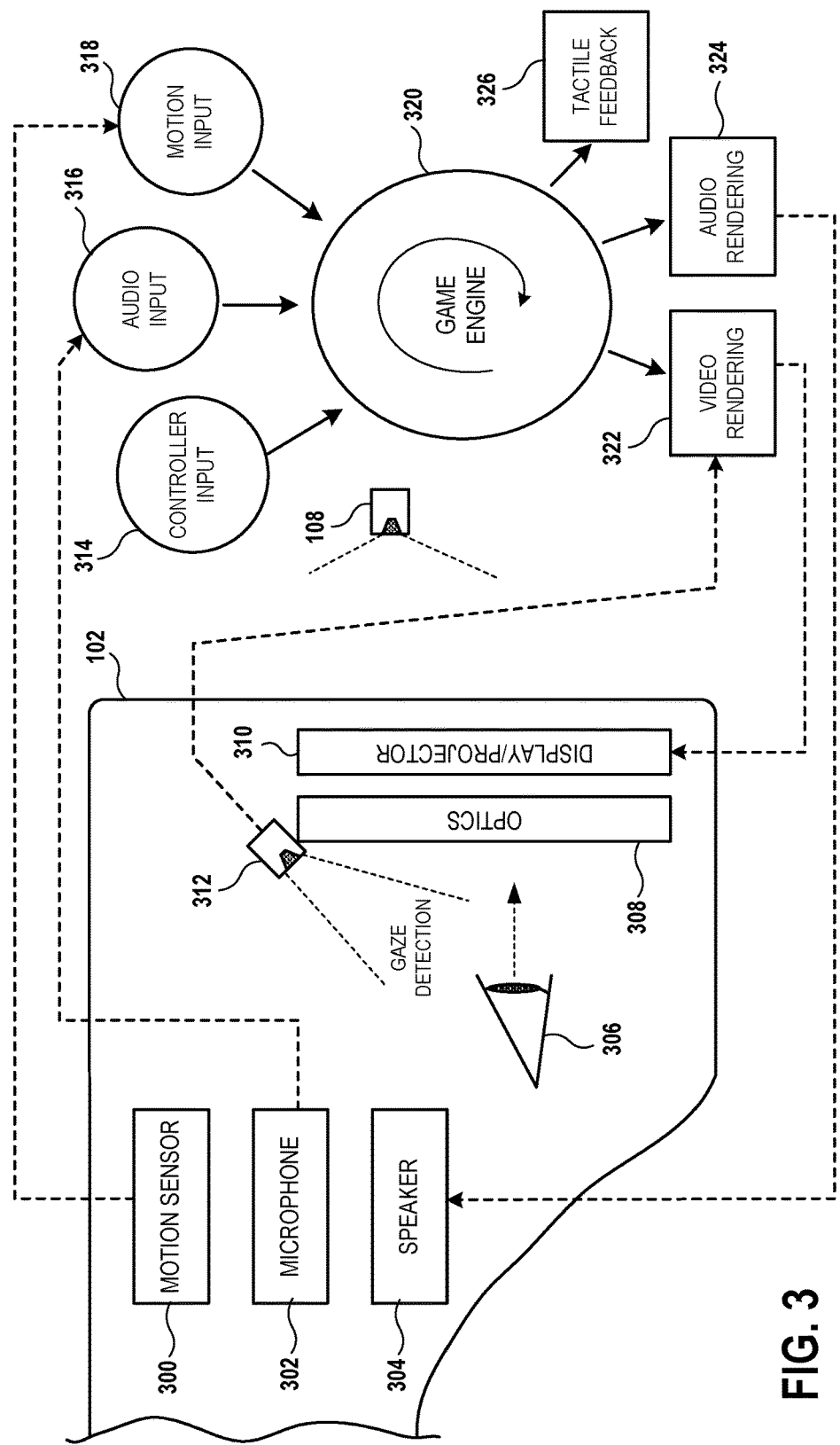
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. In light of this immersive aspect of the HMD experience, it is desirable to provide intuitive control mechanisms to the user, especially as the user may not be able to see their own hands or objects (e.g. controller) they are holding. Thus, in accordance with embodiments of the invention described herein, methods, apparatus, and systems are provided for a glove interface object.

Throughout the present disclosure, reference is made to the glove interface object and the user's hand, including the fingers, palm, and other portions thereof. For purposes of ease of description and readability of the present disclosure, it will be understood by those skilled in the art that the glove interface object and the user's hand (and/or portion thereof) may in many instances be referenced interchangeably and/or in the alternative. That is, an activity (e.g. pose, position, movement, orientation, location, action, etc.) defined by a user's hand, also pertains to the glove interface object that is being worn on the user's hand, as the glove interface object is configured to detect or facilitate detection of the activity of the user's hand. Therefore, it may be convenient for descriptive purposes to discuss certain aspects in the present disclosure utilizing language pertaining to the user's hand. However, it will be readily appreciated that the glove interface object is worn on the user's hand and that such may apply or in fact be defined by the glove interface object, this being apparent to those skilled in the art from the context of the description.

FIG. 4A illustrates a glove interface object for providing haptic feedback, in accordance with an embodiment of the invention. In the illustrated embodiment, a side view of the glove interface object 104 is shown, so as to illustrate the presence of magnetic actuators 402, 404, and 406. The magnetic actuators are positioned on the palmar (front) side of the index finger portion of the glove interface object 104.

When a given magnetic actuator is activated, the activation can cause pressure to be exerted on that portion of the user's hand. The magnetic actuators may in some embodiments correspond to the phalanges of the finger. That is, when the magnetic actuator 402 is activated, then pressure is exerted on the distal phalanx of the user's index finger. When the magnetic actuator 404 is activated, then pressure is exerted on the intermediate phalanx of the user's index finger; and when the magnetic actuator 406 is activated, then pressure is exerted on the proximal phalanx of the user's index finger.

It will be appreciated that the magnetic actuators may be selectively activated to simulate different kinds of haptic feedback. Furthermore, the amount of power applied to a given magnetic actuator may be varied to provide for a desired amount of pressure to be exerted on a portion of the user's hand. For example, if only the tip of the index finger of a corresponding virtual hand is touching a virtual object in a virtual environment, then the magnetic actuator 402 can be selectively activated to provide a haptic feedback effect of pressure at the tip of the index finger (distal phalanx) that simulates the feeling of touching an object with the user's index finger. Furthermore, the amount of pressure felt can be varied by increasing or decreasing the amount of power applied to the magnetic actuator 402 to, for example, simulate pressing harder or lighter, respectively, on the virtual object with the index finger of the virtual hand.

It should be appreciated that though the present configuration is described with respect to the index finger portion of the glove interface object 104, a similar configuration may be provided for the other fingers of the glove interface object 104, including the thumb, middle, ring, and pinky finger portions of the glove interface object. Further, similar configurations of magnetic actuators can be provided on the palm portion of the glove interface object.

In some implementations, the magnetic actuator can be defined by a structure shown at ref. 410, which illustrates a cross-section of the magnetic actuator 402. As shown, the magnetic actuator 402 is defined by a pair of magnets 411a and 411b, which are configured so that they may be controllably activated to repel one another. In some implementations, at least one of the pair of magnets 411a and 411b is an electromagnet. In some implementations, both of the magnets 411a and 411b are electromagnets. In other implementations, one of the magnets 411a or 411b is a permanent magnet, while the other is an electromagnet. It will be appreciated that by controlling the activation of the electromagnet(s) which define the magnetic actuator, then the magnets may be caused to repel one another, thereby exerting pressure on a portion of the user's hand. With continued reference to the implementation shown at ref. 410, the magnets 411a and 411b are attached to respective portions of fabric 412a and 412b, to secure the magnets 411a and 411b at locations opposing each other.

In another implementation, shown at ref. 420, there may be several magnetic actuators defined by, for example, magnets 422a and 422b which are embedded within fabric 424a and 424b, respectively. The fabric portions 424a and 424b may be connected by stitching 426, which can be elastic to allow for separation of the fabric portions caused by activation of the magnets. Furthermore, the fabric may also be elastic to accommodate such movement.

The glove interface object 104 includes a controller 414 that is configured to control the activation/deactivation and level/strength of activation of the magnetic actuators. The controller 414 may be configured to receive haptic feedback data from an external device (e.g. gaming console) that defines the activation/deactivation and level/strength of activation of the electromagnets of the magnetic actuators. In one embodiment, the haptic feedback data is generated by a computing device (e.g. game console, computer, etc.) that executes an interactive application defining a virtual environment including one or more virtual objects. The glove interface object 104 may be utilized to control a virtual hand in the virtual environment, and the haptic feedback data can be generated based on interactions of the virtual hand with the virtual objects. The haptic feedback data can define the activation/deactivation and level/strength of activation of the electromagnets of the magnetic actuators, so as to provide the user a feeling of physical interaction of their hand with the virtual objects.

In some implementations, the controller 414 may be defined at/on a bracelet or wrist portion 416 that is defined as part of the glove interface object 104. However, it should be appreciated that in other implementations, the controller 414 may be defined at any other location on the glove interface object 104 (e.g. on the dorsal side of the palm portion).

Figure 4B:
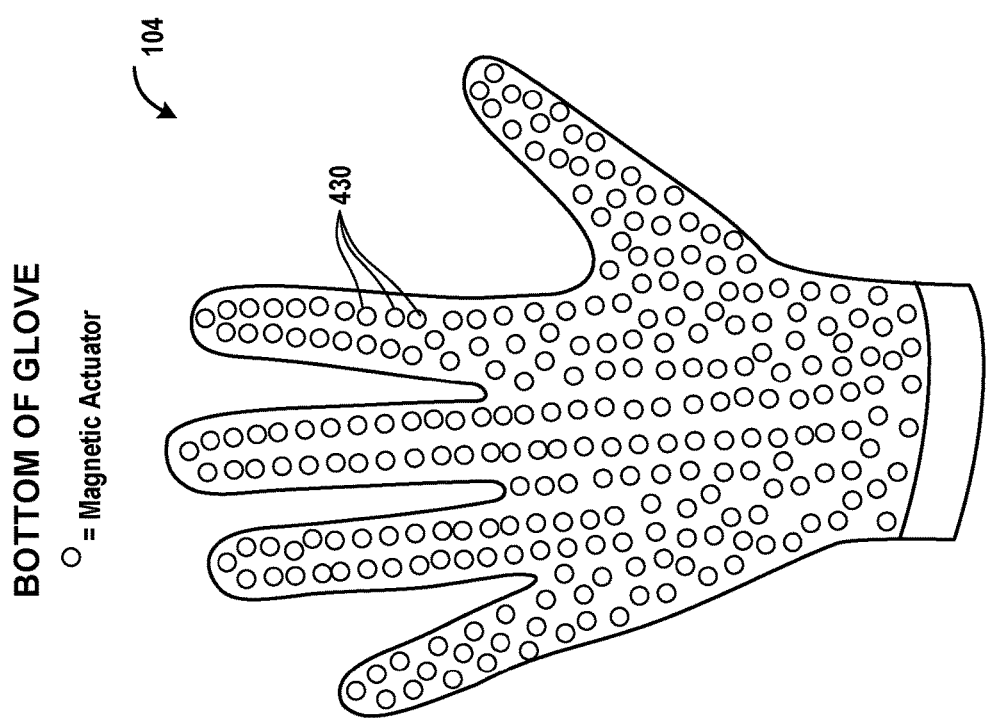
FIG. 4B illustrates a glove interface object 104 having a plurality of magnetic actuators distributed throughout the bottom portion (palmar side) of the glove, in accordance with implementations of the disclosure.

FIG. 4B illustrates a glove interface object 104 having a plurality of magnetic actuators (e.g. ref. 430) distributed throughout the bottom portion (palmar side) of the glove, in accordance with implementations of the disclosure. It will be appreciated that in other implementations, such magnetic actuators can also be distributed throughout the top portion (dorsal side) of the glove interface object.

Figure 5A:
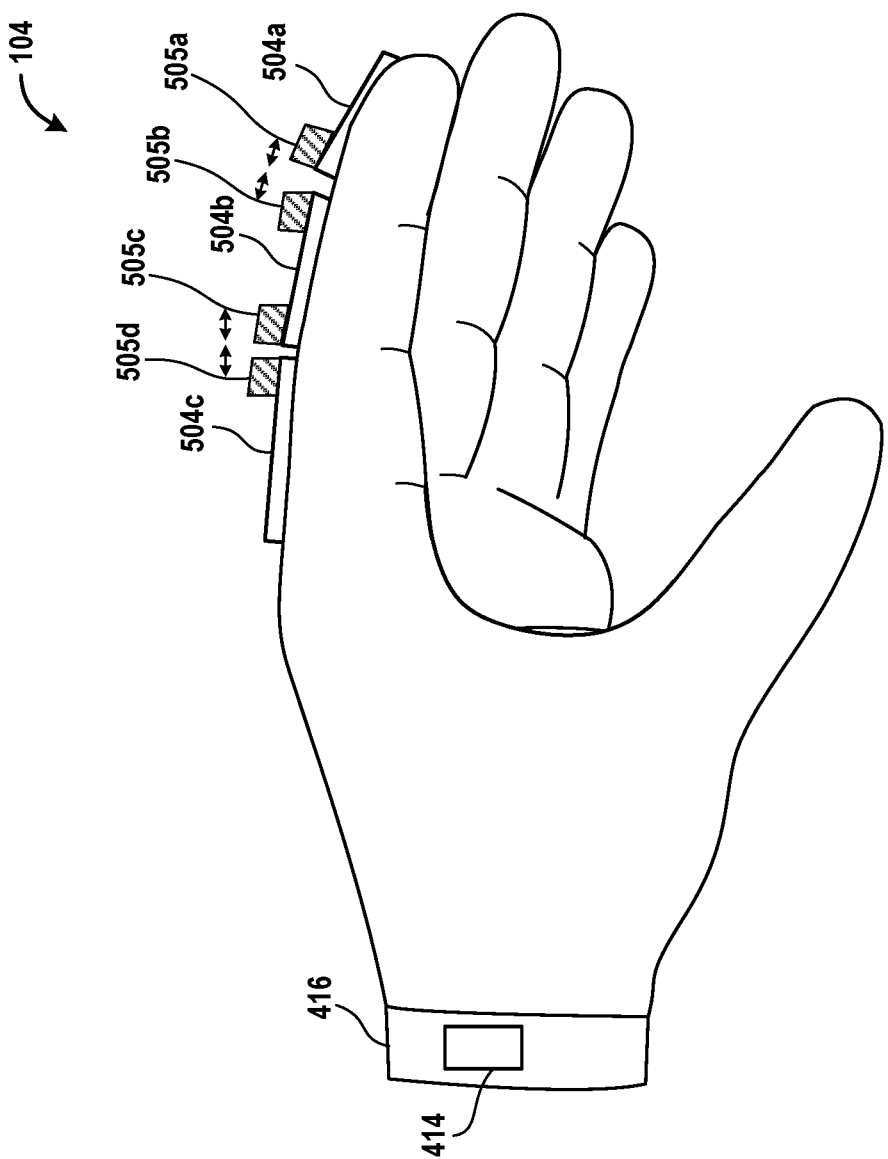
FIG. 5A illustrates a glove interface object for providing haptic feedback, in accordance with an embodiment of the invention.

FIG. 5A illustrates a glove interface object for providing haptic feedback, in accordance with an embodiment of the invention. Rigid mounting structures 504a, 504b, and 504c are provided, on which several electromagnets 505a, 505b, 505c, and 505d are mounted. Electromagnet 505a is mounted at the proximal end of mounting structure 504a; electromagnets 505b and 505c are mounted at the distal and proximal ends, respectively, of mounting structure 504b; and electromagnet 505d is mounted at the proximal end of mounting structure 504c. The mounting structures 504a/b/c can be defined from a rigid or semi-rigid material (e.g. a plastic material).

The electromagnets can be selectively and controllably activated to produce haptic feedback. For example, electromagnets 505a and 505b, which are disposed in proximity to each other, can be activated to attract one another or repel one another. When electromagnets 505a and 505b are activated to attract one another, then this produces an effect of straightening or resisting bending of the distal interphalangeal joint of the index finger. When electromagnets 505a and 505b are activated to attract one another, then this produces an effect of straightening or resisting bending of the distal interphalangeal joint of the index finger. When electromagnets 505a and 505b are activated to repel one another, then this produces an effect of bending or resisting straightening of the distal interphalangeal joint of the index finger. Similarly, when electromagnets 505c and 505d are activated to attract one another, then this produces an effect of straightening or resisting bending of the proximal interphalangeal joint of the index finger. When electromagnets 505c and 505d are activated to repel one another, then this produces an effect of bending or resisting straightening of the proximal interphalangeal joint of the index finger. The mounting structures serve to spread the force exerted by the activation of the electromagnets over a larger area.

Though in the above-described implementation, pairs of electromagnets are defined (e.g. electromagnets 505a and 505*b*) to attract or repel one another, in other implementations, one of the electromagnets of a given pair may be substituted with a permanent magnet. It will be appreciated that the corresponding electromagnet may be activated to attract or repel its corresponding permanent magnet according to polarity of activation.

It will be appreciated that the magnet-pairs along a given finger portion will frequently be activated simultaneously, though they may also be activated in a non-simultaneous manner. Further, the magnet-pairs along the given finger may be activated in a similar/same mode (e.g. both in an attracting mode, or both in a repelling mode), as a user's finger is generally bent or straightened simultaneously at both the proximal and distal interphalangeal joints.

By activating magnet-pairs which are included in a glove interface object as described above, various interactions of a virtual hand in a virtual space can be haptically simulated, such as touching or holding a virtual object, movement in a viscous fluid, etc.

Figure 5B:
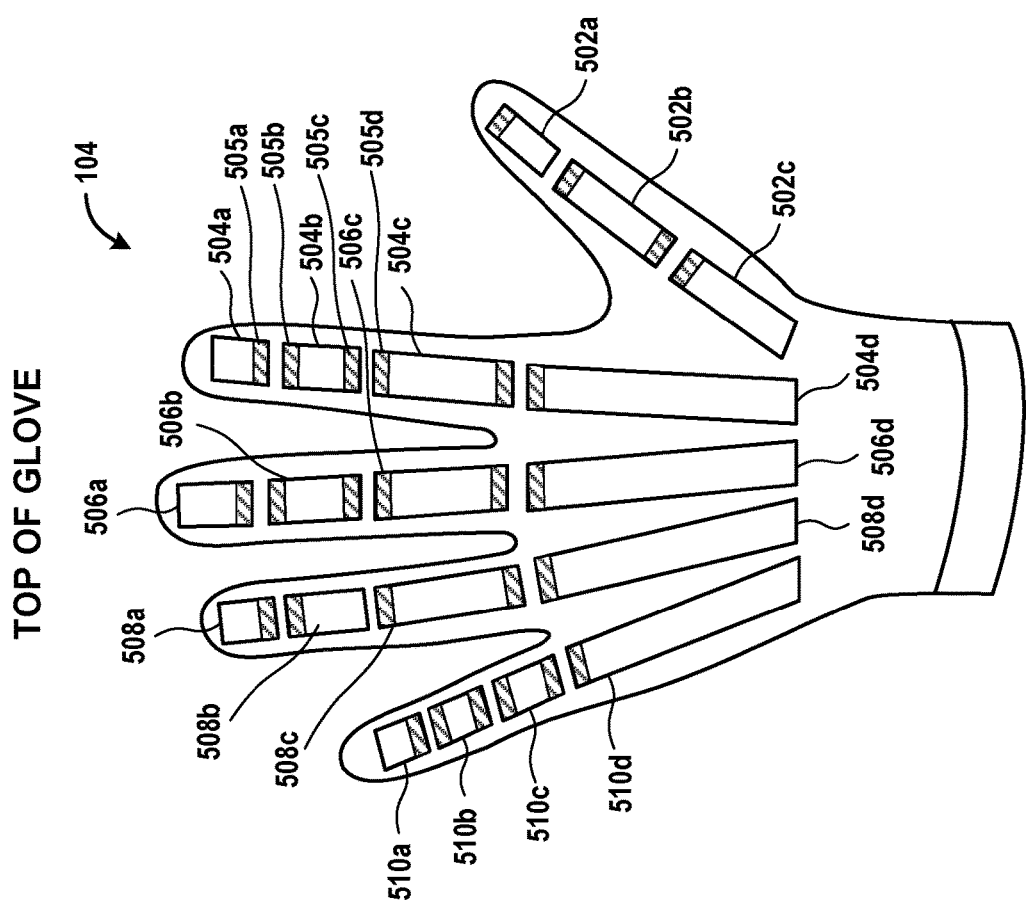
FIG. 5B illustrates the dorsal side of a glove interface object for providing haptic feedback, in accordance with an embodiment of the invention.

FIG. 5B illustrates the dorsal side of a glove interface object for providing haptic feedback, in accordance with an embodiment of the invention. The glove interface object 104 is shown to include a plurality of rigid mounting structures configured to correspond to the various segments of the user's hand, and having magnets mounted thereto at proximal and/or distal ends of the mounting structures.

The mounting structures 502*a* and 502*b* are defined along the distal phalanx and proximal phalanx, respectively, of the thumb portion of the glove interface object 104. The mounting structures 504*a*, 504*b*, and 504*c*, are defined along the distal phalanx, intermediate phalanx, and proximal phalanx, respectively, of the index finger portion of the glove interface object 104. The mounting structures 506*a*, 506*b*, and 506*c*, are defined along the distal phalanx, intermediate phalanx, and proximal phalanx, respectively, of the middle finger portion of the glove interface object 104. The mounting structures 508*a*, 508*b*, and 508*c*, are defined along the distal phalanx, intermediate phalanx, and proximal phalanx, respectively, of the ring finger portion of the glove interface object 104. The mounting structures 510*a*, 510*b*, and 510*c*, are defined along the distal phalanx, intermediate phalanx, and proximal phalanx, respectively, of the pinky/little finger portion of the glove interface object 104. The mounting structures 502*c*, 504*d*, 506*d*, 508*d*, and 510*d* are defined along the metacarpal portions of the glove interface object (so as to be positioned on the back of the hand). As has been described, a proximal pair of magnets mounted on adjacent mounting structures, can be selectively and controllably activated to provide a force that either causes/resists bending or causes/resists straightening of a joint of the user's hand. The control of such activation can be performed in response to interactions of a virtual hand with virtual objects in a virtual environment, to provide haptic feedback to the user.

Figure 6:
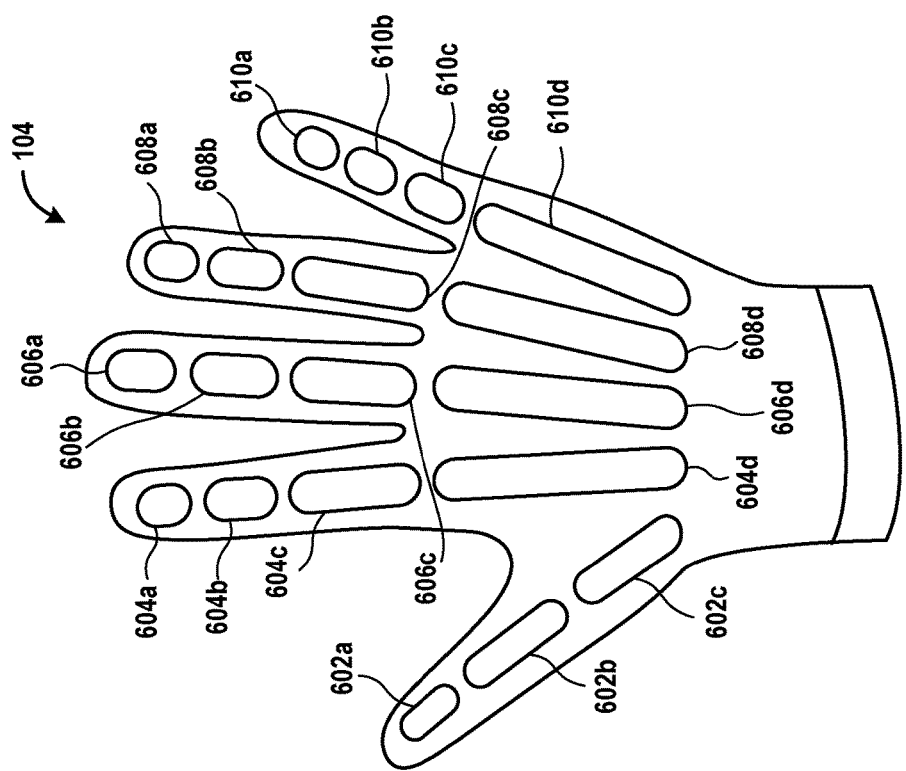
FIG. 6 illustrates the palmar side of a glove interface object for providing haptic feedback, in accordance with an embodiment of the invention.

FIG. 6 illustrates the palmar side of a glove interface object for providing haptic feedback, in accordance with an embodiment of the invention. The glove interface object 104 is shown to include a plurality of fluid pockets configured to correspond to the various segments of the user's hand. The fluid pockets are configured to be controllably filled with a fluid (gas or liquid) to provide haptic feedback.

The fluid pockets 602*a* and 602*b* are defined along the distal phalanx and proximal phalanx, respectively, of the thumb portion of the glove interface object 104. The fluid pockets 604*a*, 604*b*, and 604*c*, are defined along the distal phalanx, intermediate phalanx, and proximal phalanx, respectively, of the index finger portion of the glove interface object 104. The fluid pockets 606*a*, 606*b*, and 606*c*, are defined along the distal phalanx, intermediate phalanx, and proximal phalanx, respectively, of the middle finger portion of the glove interface object 104. The fluid pockets 608*a*, 608*b*, and 608*c*, are defined along the distal phalanx, intermediate phalanx, and proximal phalanx, respectively, of the ring finger portion of the glove interface object 104. The fluid pockets 610*a*, 610*b*, and 610*c*, are defined along the distal phalanx, intermediate phalanx, and proximal phalanx, respectively, of the pinky/little finger portion of the glove interface object 104. The fluid pockets 602*c*, 604*d*, 606*d*, 608*d*, and 610*d* are defined along the metacarpal portions of the glove interface object (so as to be positioned on the front (palmar side) of the hand).

Various ones of the fluid pockets can be selectively filled or drained to provide haptic feedback. For example, to simulate the feeling of holding an object, some of the fluid pockets may be filled so that they expand and provide a sensation of an object in the user's hand. When a fluid pocket is filled, it causes pressure to be exerted on a portion of the user's hand that is adjacent to the fluid pocket being filled. Fluid pockets can be selectively filled to simulate the effect of an object touching certain parts of the user's hand. Different ones of the fluid pockets can be filled to different degrees to produce an effect of differing amounts of pressure on different parts of the user's hand. This may simulate touching different portions of a virtual object to different degrees (e.g. object with surface variations). It will be appreciated that filling of the fluid pockets may also produce an effect that resists bending of the user's fingers and/or closure of the user's hand.

Figure 7:
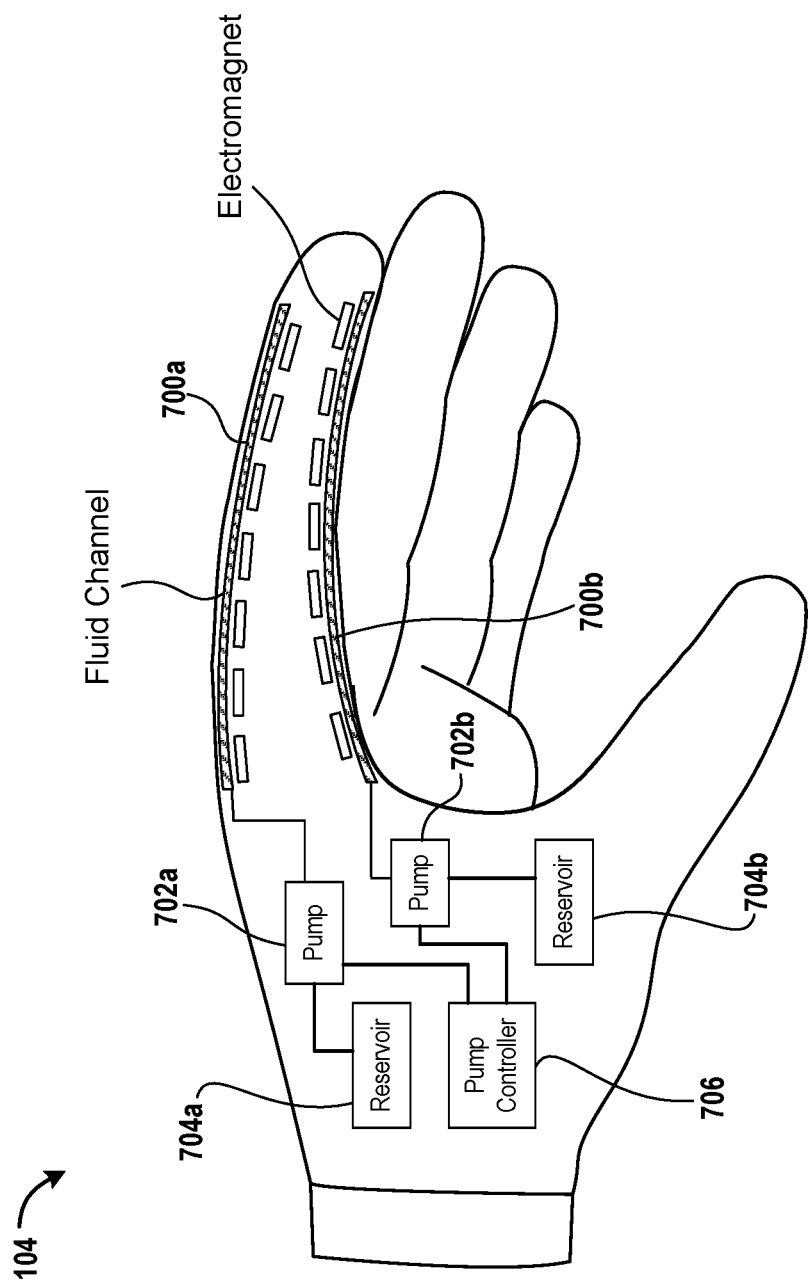
FIG. 7 illustrates a glove interface object for providing haptic feedback, in accordance with implementations of the disclosure.
Figure 8:
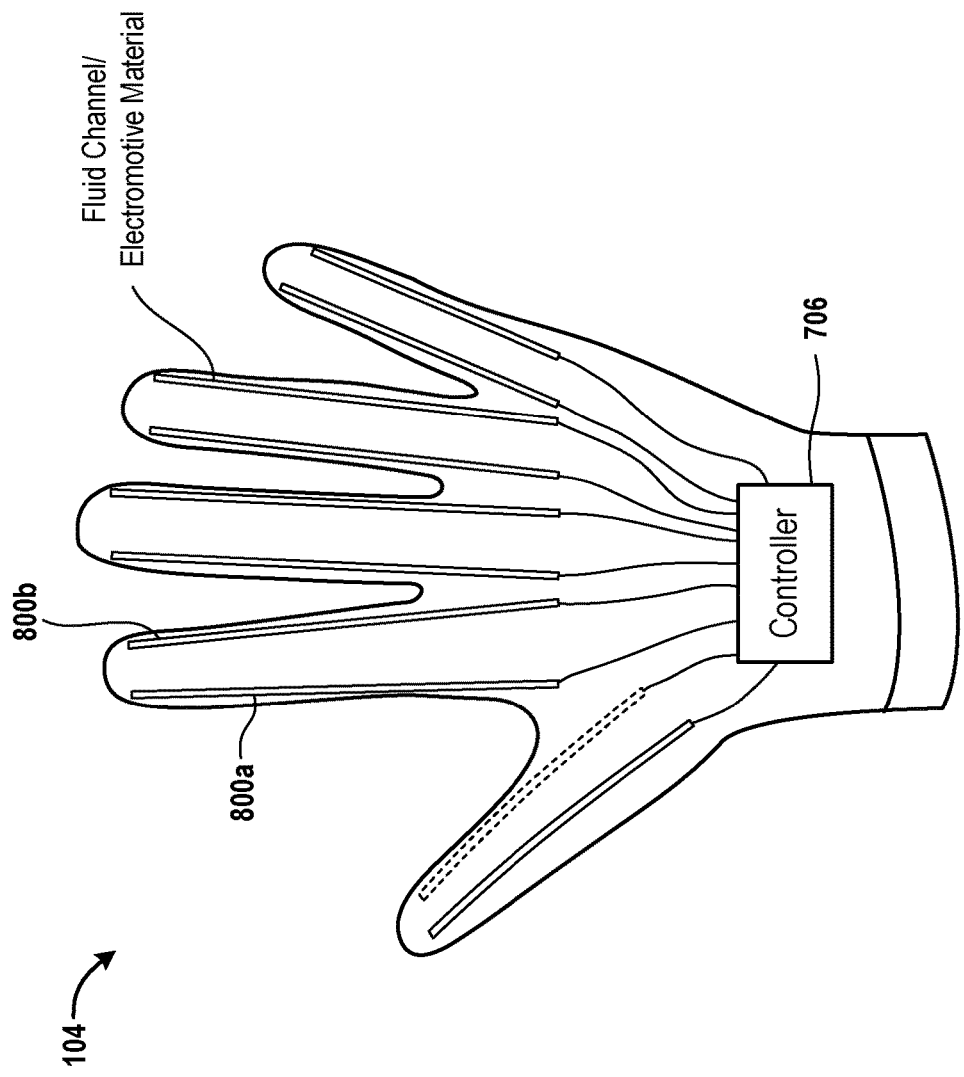
FIG. 8 illustrates a glove interface object for providing haptic feedback, in accordance with implementations of the disclosure.

FIG. 7 illustrates a glove interface object for providing haptic feedback, in accordance with implementations of the disclosure. As shown, fluid channels 700*a* and 700*b* are defined along the finger portion of the glove interface object 104. A pump 702*a*/702*b* can be controlled by a pump controller 706 to control the filling or drainage of fluid from one or both of the fluid channels 700*a*/700*b*. The fluid can be moved from a reservoir 704*a*/704*b* to the fluid channels 700*a*/700*b* by the pump 702*a*/702*b*, and vice versa (from the fluid channels back to the reservoir). In some implementations, filling the fluid channels produces an effect of stiffening the glove, so that it is more resistant to movements of the user's fingers (which deviate from a default position). This could haptically mimic the effect of placing a corresponding virtual hand into a virtual fluid, for example. In some implementations, fluid channels are distributed along the dorsal and/or palmar sides of the fingers. In some implementations, as illustrated at FIG. 8, fluid channels (e.g. ref. 800*a*/800*b*) are distributed along the lateral sides of the fingers.

Furthermore, the fluid can be a magnetic fluid (e.g. ferrofluid, magnetorheological fluid, etc.) that is susceptible to applied magnetic fields, or other types of smart fluids (e.g. electrorheological fluid, for which electrodes would be provided in connection to the fluid channels (not shown)). In some implementations, electromagnets are configured adjacent to the fluid channels to control movement of magnetic fluid within the magnetic channels. By selectively activating electromagnets, magnetic fluid can be caused to migrate to certain locations, causing expansion of the fluid channels in such locations and thereby providing a tactile sensation. Additionally, an applied magnetic field may increase the effective viscosity of the magnetic fluid, so that it is more resistant to flowing within the fluid channels, and therefore the fluid channels may be more resistant to flexing caused by movement of the user's hand. This can also change the tactile feel of the glove so that it feels stiffer and may be intentionally applied as a haptic feedback mechanism. Note that because the activation of electromagnets is practically instantaneous, the haptic effects realized through such a system can also be nearly instantaneous.

Figure 9:
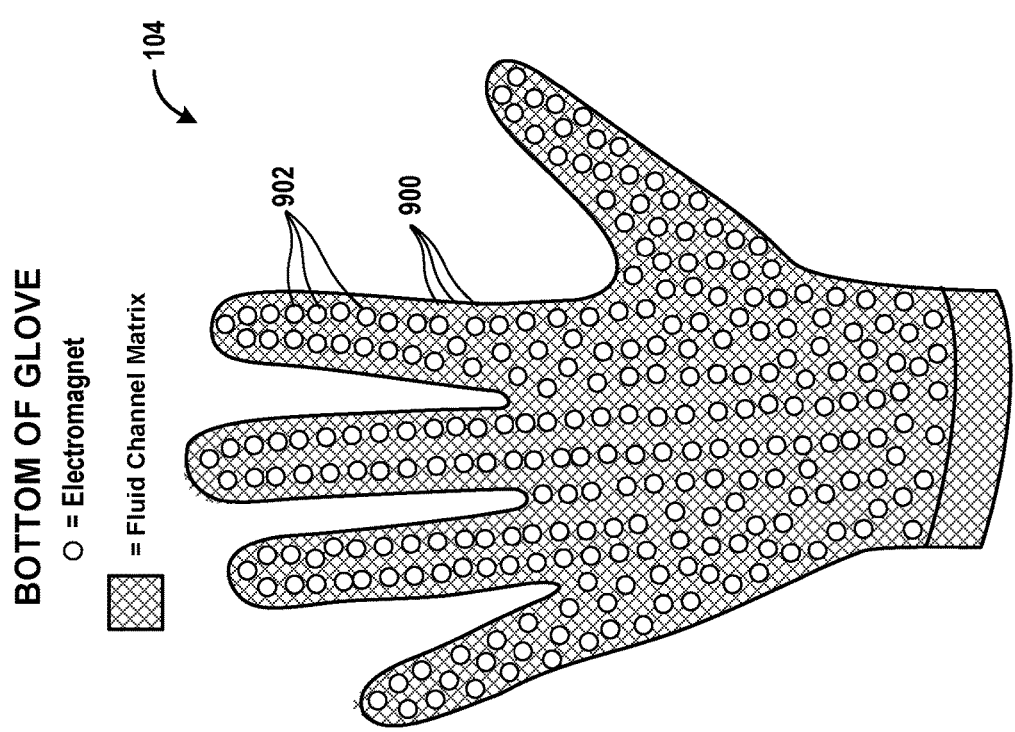
FIG. 9 illustrates a glove interface object having a fluid channel matrix, in accordance with implementations of the disclosure.

FIG. 9 illustrates a glove interface object having a fluid channel matrix, in accordance with implementations of the disclosure. In some implementations, the fluid channel matrix (e.g. ref. 900) is composed of a plurality of intersecting fluid channels distributed throughout the glove interface object 104. Though the bottom of the glove (palmar side) is shown, a similar configuration can be provided for the top of the glove (dorsal side). The fluid can be caused to migrate within the fluid channel matrix (or locally change fluid properties such as viscosity) under the influence of magnetic fields which are generated by selective activation of the electromagnets (e.g. ref. 902). For example, fluid may migrate to regions of the fluid channel matrix that are proximate to the electromagnets that are currently activated, causing such regions to swell and therefore providing a tactile sensation. In some implementations, the fluid channels can be defined by microfluidic channels.

Figure 10:
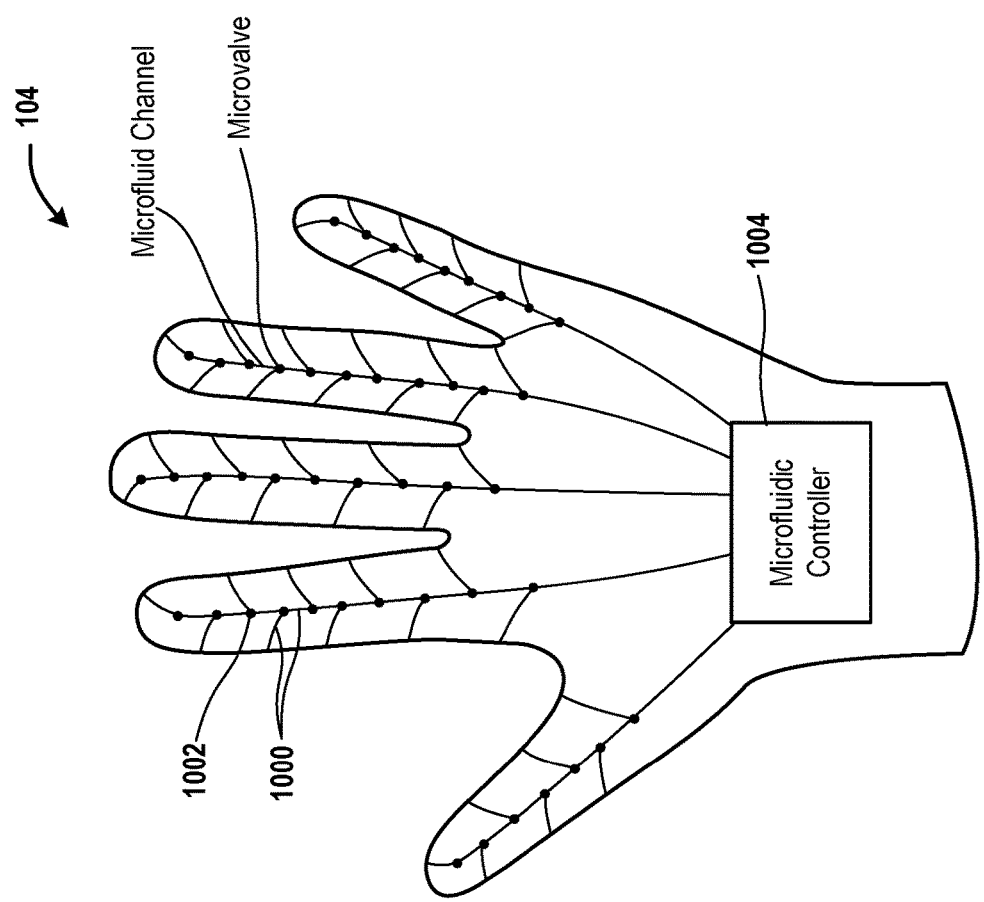
FIG. 10 illustrates a glove interface object having a plurality of microfluidic channels, in accordance with implementations of the disclosure.

FIG. 10 illustrates a glove interface object 104 having a plurality of microfluidic channels, in accordance with implementations of the disclosure. The flow of fluid in the microfluidic channels (e.g. ref. 1000) can be controlled by a plurality of microvalves (e.g. ref. 1002) under the control of a microfluidic controller 1004. The filling/draining of the microfluidic channels can produce tactile sensations and/or change the stiffness of the glove.

Figure 11:
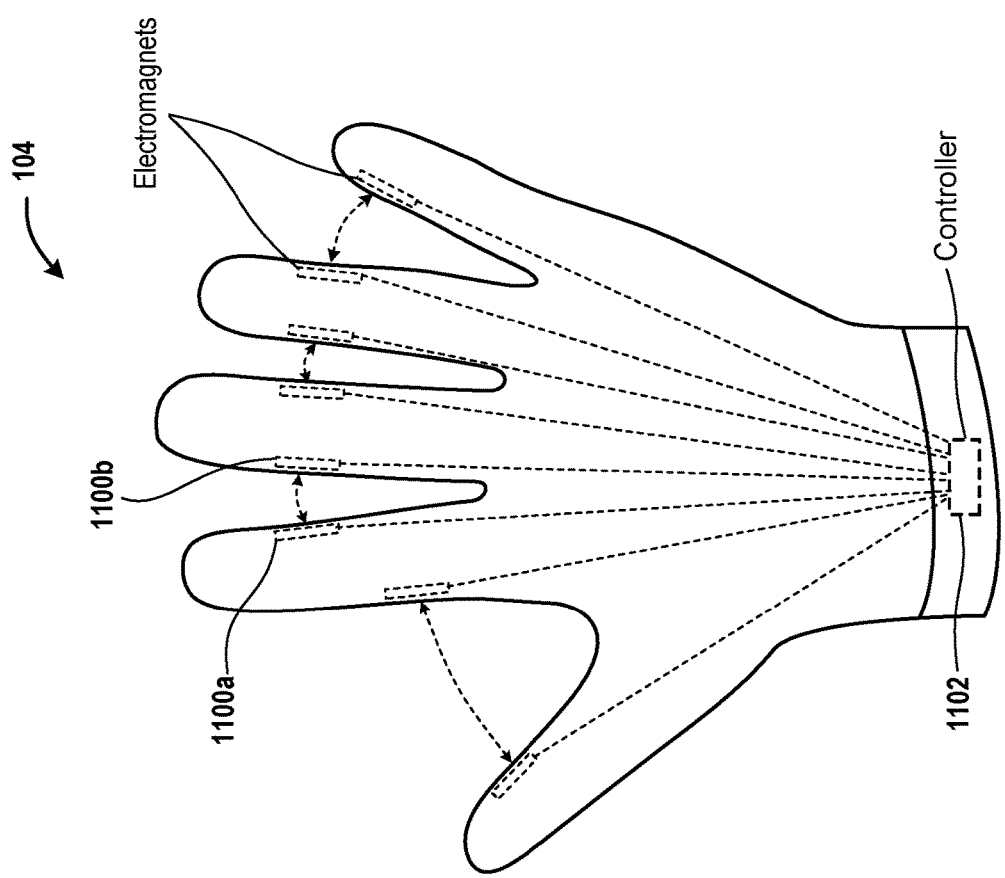
FIG. 11 illustrates a glove interface object having a plurality of electromagnets mounted along lateral sides of the fingers, in accordance with implementations of the disclosure.

FIG. 11 illustrates a glove interface object 104 having a plurality of electromagnets mounted along lateral sides of the fingers, in accordance with implementations of the disclosure. The electromagnets can be activated to cause the fingers to be attracted to one another or to repel one another. By way of example, electromagnets 1100a (on the index finger portion) and 1100b (on the middle finger portion) can be controlled to attract or repel one another, therefore causing the index and middle fingers of the user to be attracted to, or repelled from, one another respectively. The electromagnets can be controlled by a controller 1102 based on haptic feedback data received from a computing device.

Figure 12:
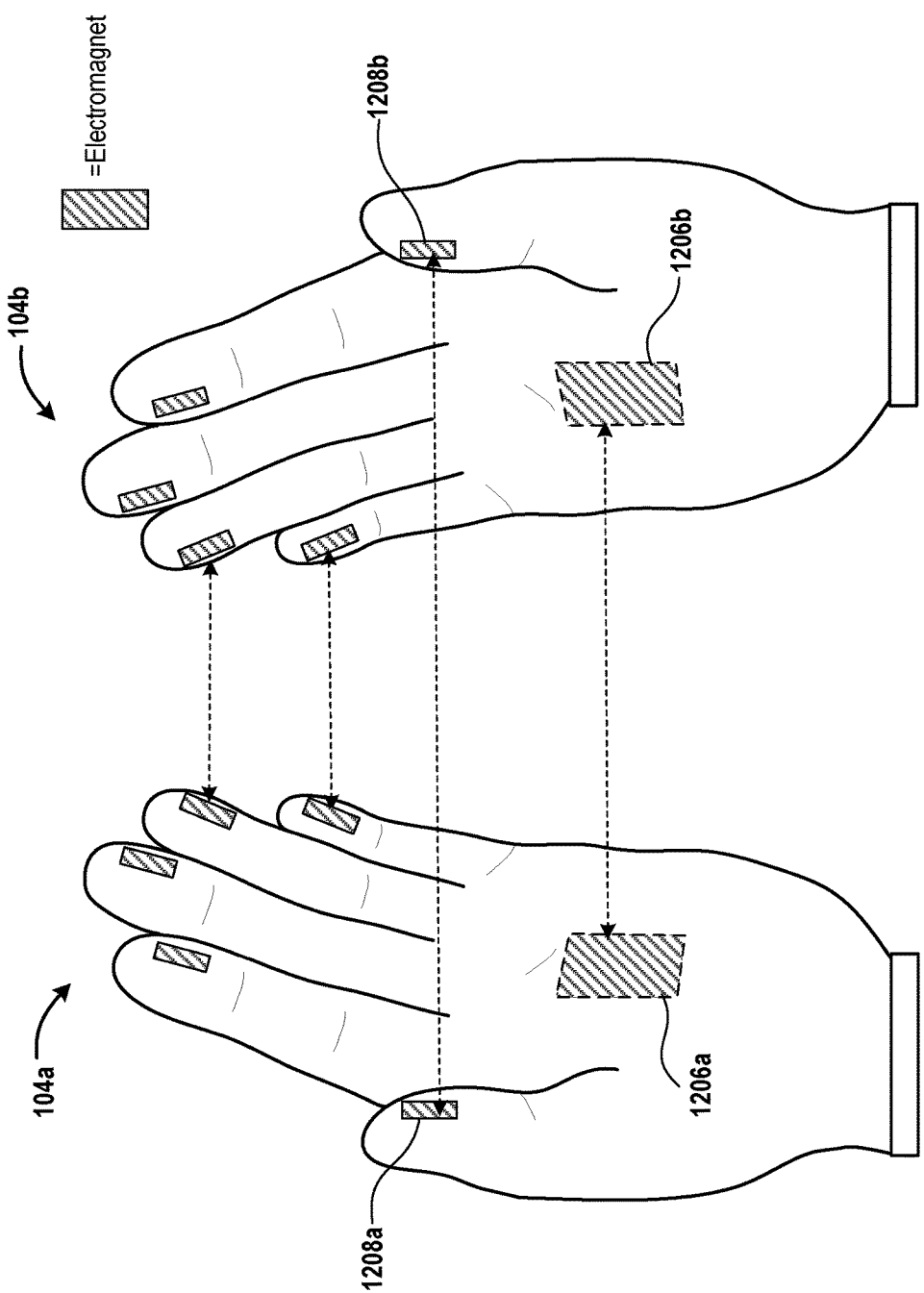
FIG. 12 illustrates a pair of glove interface objects (left and right hand) having electromagnets defined on the palmar sides of the gloves.

FIG. 12 illustrates a pair of glove interface objects (left and right hand) 104a and 104b having electromagnets defined on the palmar sides of the gloves. The electromagnets (e.g. refs. 1206a, 1206b, 1208a, 1208b) can be configured and activated to attract one another (thereby attracting the hands together) or repel one another (thereby repelling the hands from each other).

Figure 13:
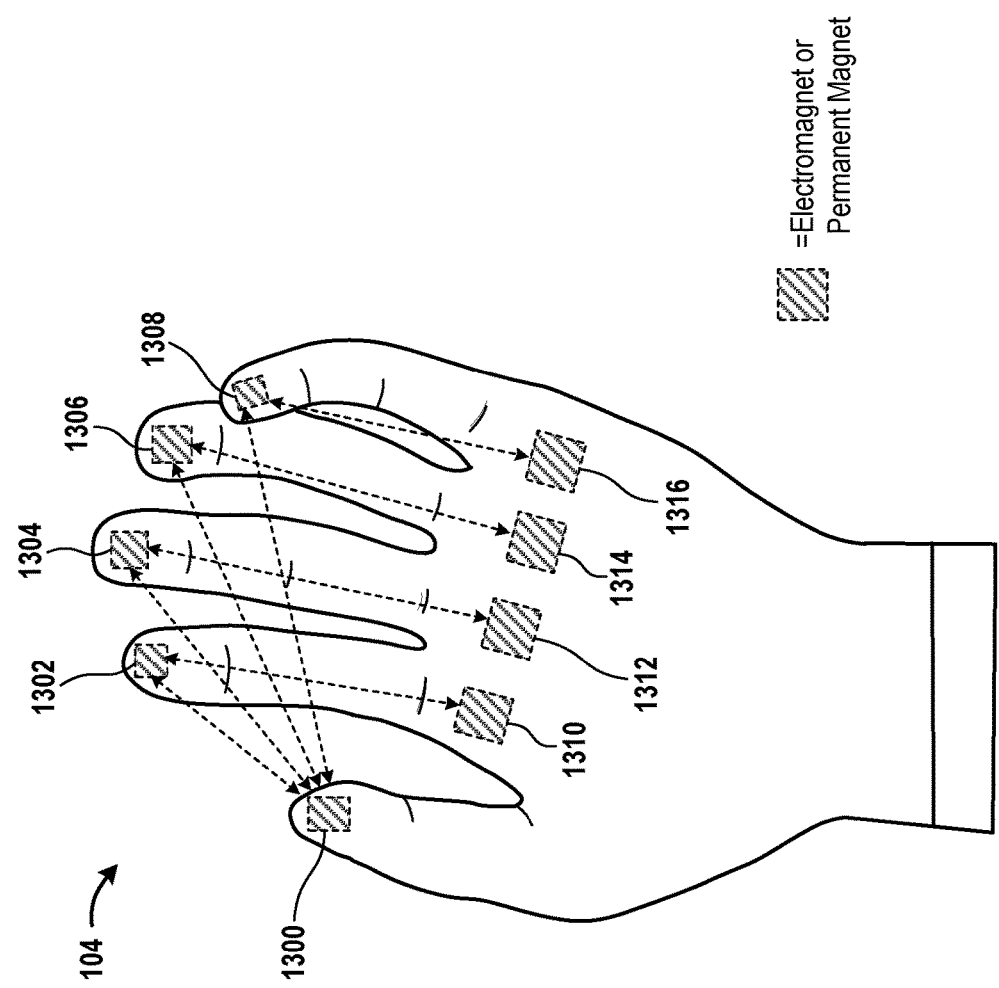
FIG. 13 illustrates a glove interface object having a plurality of magnets (electromagnets and/or permanent magnets) defined at the fingertips and on the palm, in accordance with implementations of the disclosure.

FIG. 13 illustrates a glove interface object having a plurality of magnets (electromagnets and/or permanent magnets) defined at the fingertips (refs. 1300, 1302, 1304, 1306, and 1308) and on the palm (refs. 1310, 1312, 1314, and 1316), in accordance with implementations of the disclosure. The electromagnets can be selectively activated to cause the fingers to be attracted to one another or to repel one another. Fingertips can also be attracted to or repelled from the palm.

Figure 14:
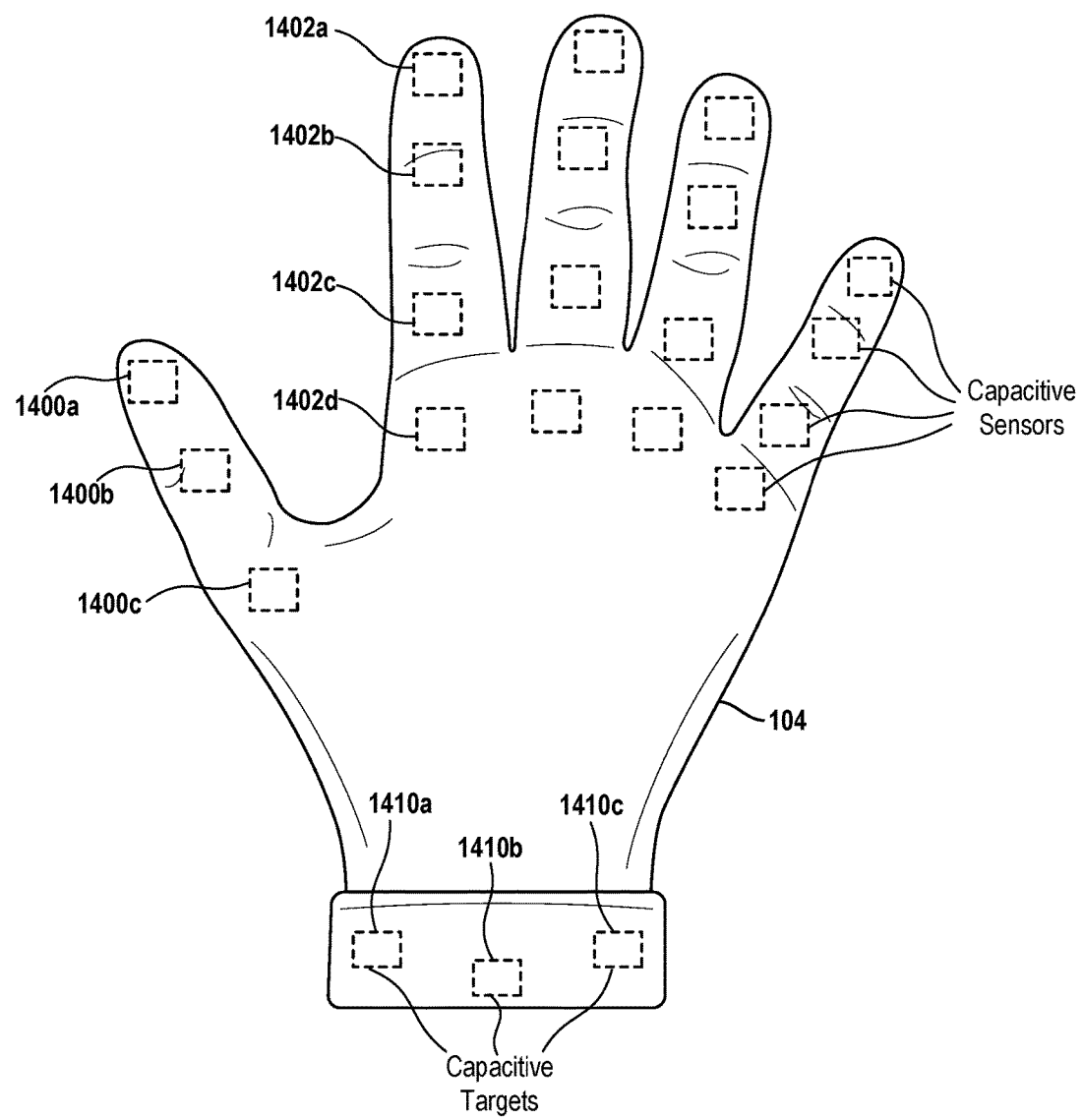
FIG. 14 illustrates a glove interface object having a plurality of capacitive (displacement) sensors, in accordance with implementations of the disclosure.

FIG. 14 illustrates a glove interface object having a plurality of capacitive (displacement) sensors, in accordance with implementations of the disclosure. The capacitive sensors are configured to detect proximity/distance to/from one or more capacitive targets. For example, a number of capacitive sensors can be positioned along each digit of the glove interface object 104, such as capacitive sensors 1400a, 1400b, and 1400c along the thumb portion, and capacitive sensors 1402a, 1402b, 1402c, and 1402d along the index finger portion as shown in the illustrated implementation.

There may be multiple capacitive targets, such as capacitive targets 1410a, 1410b, and 1410c, as shown in the illustrated implementation. The capacitive targets can be arranged to enable localization of a given capacitive sensor relative to the capacitive targets based on triangulation using the distances from the given capacitive sensor to each of the capacitive targets. In this manner, the positioning of the capacitive sensors, and therefore the positioning of the corresponding portions of the user's hand, can be determined with high precision.

The operation of the capacitive sensors (and/or the capacitive targets) can be time-division multiplexed so that readings for a given sensor (or target) do not interfere with readings for another sensor (or target).

It will be appreciated that understanding the positioning of the user's hand is useful for providing proper haptic feedback. For example, the interaction of a corresponding virtual hand with a virtual object changes in accordance with the positioning of the user's hand, and appropriate haptic feedback can be generated using the implementations for haptic feedback described herein.

Figure 15A:
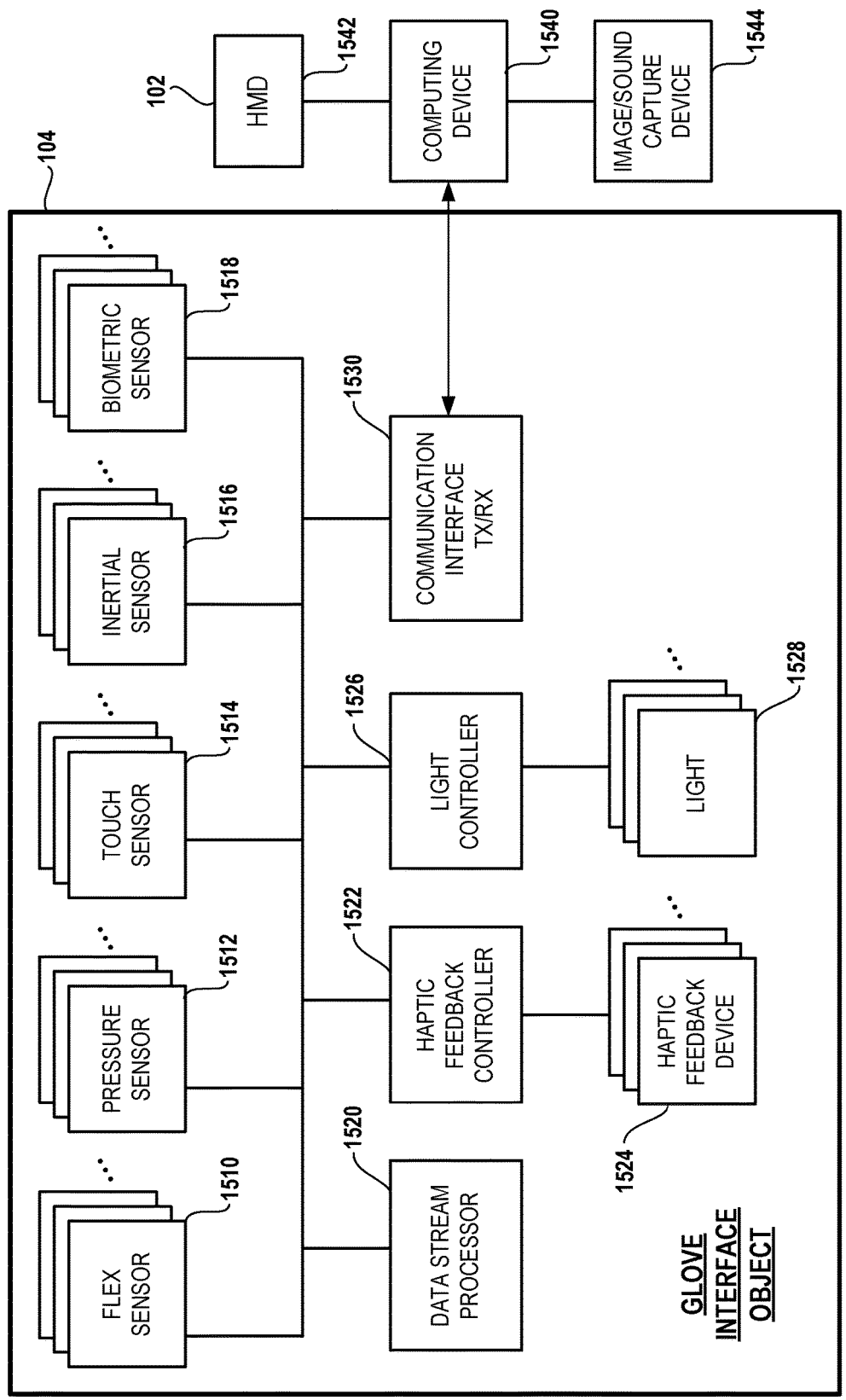
FIGS. 15A and 15B schematically illustrate a system for interfacing with an interactive application using a glove interface object, in accordance with an embodiment of the invention.

FIG. 15A schematically illustrates a system for interfacing with an interactive application using a glove interface object, in accordance with an embodiment of the invention. The glove interface object 104 includes flex sensors 1510, pressure sensors 1512, touch switches 1514, inertial sensors 1516, and biometric sensors 1518. A data stream processor 1520 is configured to process data from the various sensors. It will be appreciated that in various embodiments, the data stream processor 1520 may process sensor data to various extents, including determining values quantifying sensed activity, identifying poses, gestures, movements, etc. A haptic feedback controller 1522 is configured to control the operation of haptic feedback devices 1524. A light controller 1526 is configured to control the operation of lights 1528. A communications interface is configured to communicate data to/from other devices.

The haptic feedback devices 1524 can include the electromagnets which are configured to attract respective magnetic objects, as described in the present disclosure. The haptic feedback controller 1522 can be configured to receive data defining the activation/deactivation (on/off state) and the level/strength of activation of the electromagnets.

A computing device 1540 is configured to execute a video game, and communicate with the glove interface object 104. The video game is rendered on an display/HMD 1542. An image/sound capture device 1544 captures images and sound from the interactive environment in which the user is situated. It should be appreciated that the computing device 1540 receives data from the glove interface object such as sensor data, and the computing device may also generate commands to control the operation of the various devices of the glove interface object 104, to effect the functionality of the glove interface object discussed herein.

Figure 15B:
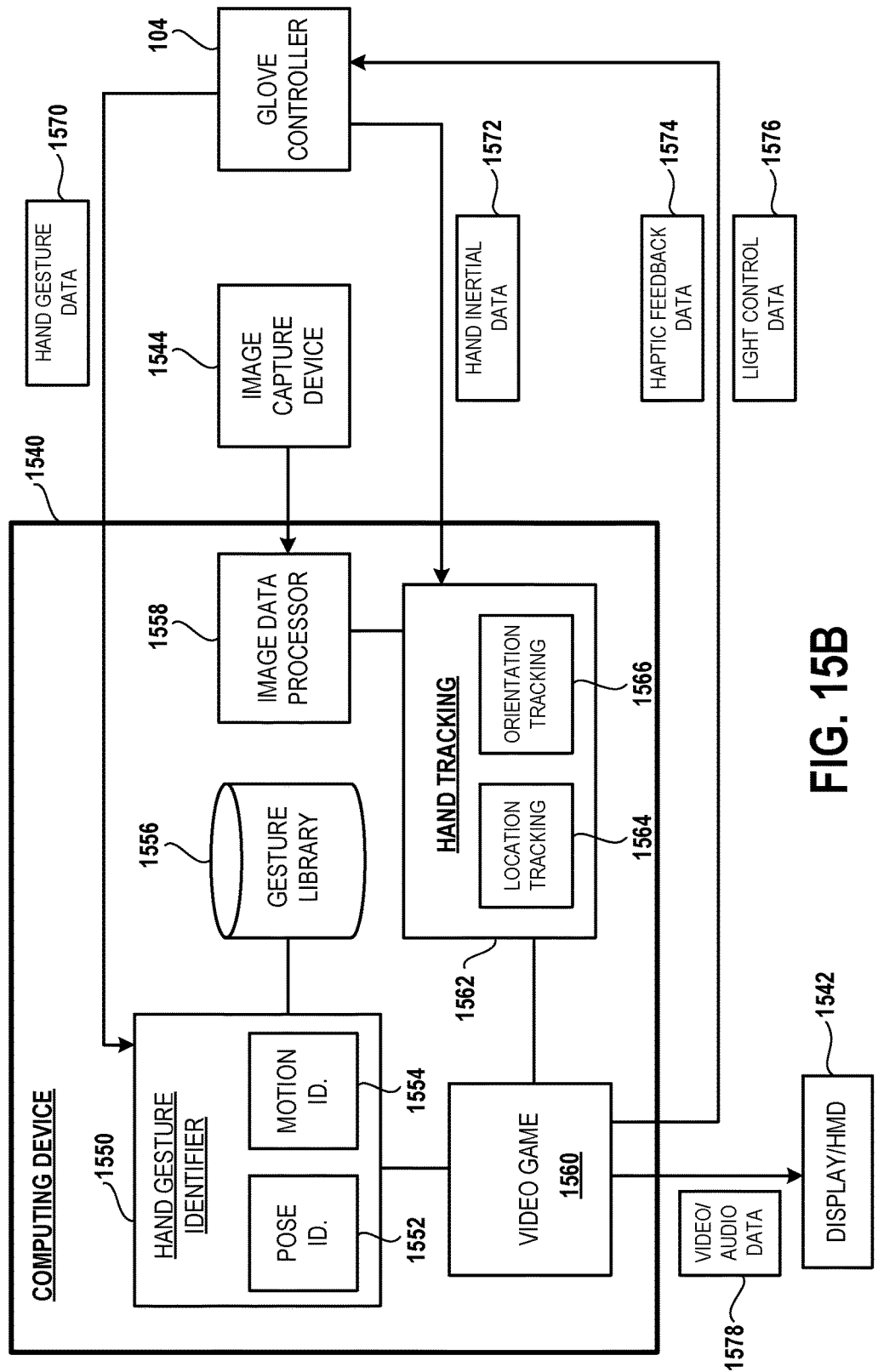

FIG. 15B illustrates additional components of the computing device 1540, in accordance with an embodiment of the invention. The glove interface object 104 provides hand gesture data, detected/processed from the glove interface object's various sensors, to a hand gesture identifier 1550. The hand gesture identifier 1550 can define a hand pose identifier 1552 for identifying a pose of the user's hand, and a hand motion identifier 1554 for identifying dynamic movements of the user's hand, such as motion and/or changes in the pose of the user's hand. These define gestures detected from the glove interface object 104 that are supplied to a video game 1560 as input. In one embodiment, a gesture library 1556 is provided, containing reference data defining various gestures, which may be utilized to identify gestures for the video game.

An image data processor 1558 processes images captured by the image capture device 1544, to identify trackable objects such as lights on the glove interface object 104. The hand tracking processor 1562 is configured to perform location tracking 1564 and orientation tracking 1566 of the hand of the user, based on the identified trackable objects as well as inertial data 1572 from the glove interface object 104. The location and orientation of the glove interface object (as defined by the user's hand) may also be provided as input to the video game 1560. The video game 1560 may generate haptic feedback data 1574 for transmission to the glove interface object 104, which thereby produces the haptic feedback. The video game 1576 may also generate light control data 1576 for controlling the lights on the glove interface object 104. Additionally, the video game 1560 generates video/audio data 1578 for rendering by the display/HMD 1542.

In some embodiments, the glove interface object is defined by an inner glove and an outer glove. The inner glove is removable and washable, whereas the outer glove contains the hardware for the glove interface object's functionality as described herein. Additionally, the inner glove may function as an insulator to insulate the hardware of the glove interface object from the user.

In some embodiments, haptic feedback can be provided by vibrating the fingertips at various frequencies to simulate textures as a user moves his fingers along a surface.

In some embodiments, force feedback mechanisms can be included in the glove interface object. Devices can be included which oppose motions of the user's hands/fingers, to simulate resistance encountered when making such motions. For example, a force feedback mechanism may oppose the motion of closing one's fingers, thus simulating the feel for grabbing/holding an object.

In some embodiments, pressure feedback mechanisms can be provided which apply pressure to at least a portion of the hand as a feedback mechanism. For example, a clamp may squeeze a finger as feedback, e.g. when touching a virtual object.

It should be appreciated that the input provided by the glove interface object can be applied to provide real-time control of a virtual hand or other object in a virtual environment. In some embodiments, the input provided by the glove interface object provides control of a non-hand-like object in the virtual environment, such as enabling manipulation of the object. In some embodiments, the input provided by the glove interface object provides real-time control of an arm or hand-like object of a character that is controlled by the user. When utilized in the context of presentation on an HMD device, the glove interface object can provide a highly immersive and intuitive experience with respect to control of an arm/hand or similar appendage of a character in the virtual environment. That is, the user can experience a sensation as if the virtual arm/hand or appendage really is their own arm/hand, resulting from the real-time control and responsiveness afforded by the glove interface object in combination with the highly immersive presentation of the HMD device.

Furthermore, it will be appreciated that within an interactive session of an interactive application, the virtual hand may be shown or not shown depending upon the execution state of the interactive application. For example, in a video game, there may be various stages/scenes/tasks/levels/etc. that may or may not require the virtual hand to be shown. Furthermore, the rendering of the virtual hand may be shown or not shown in the virtual environment depending upon the context or content of the virtual environment. For example, the virtual hand might be shown (or made available to be shown) when a specific object is present in the virtual scene, or when the user approaches the specific object to manipulate it or otherwise interact with it.

In some implementations, the pose and/or movement of the user's hand/fingers can define a gesture that can be identified from tracking the glove interface object in accordance with the principles discussed herein. The identified gesture can be configured to cause some action in the virtual environment—that is, the gesture is recognized and correlated to a produce a specific input for the interactive application that is generating the virtual environment. In various embodiments, a virtual hand may or may not be shown in conjunction with the gesture identification.

Figure 16:
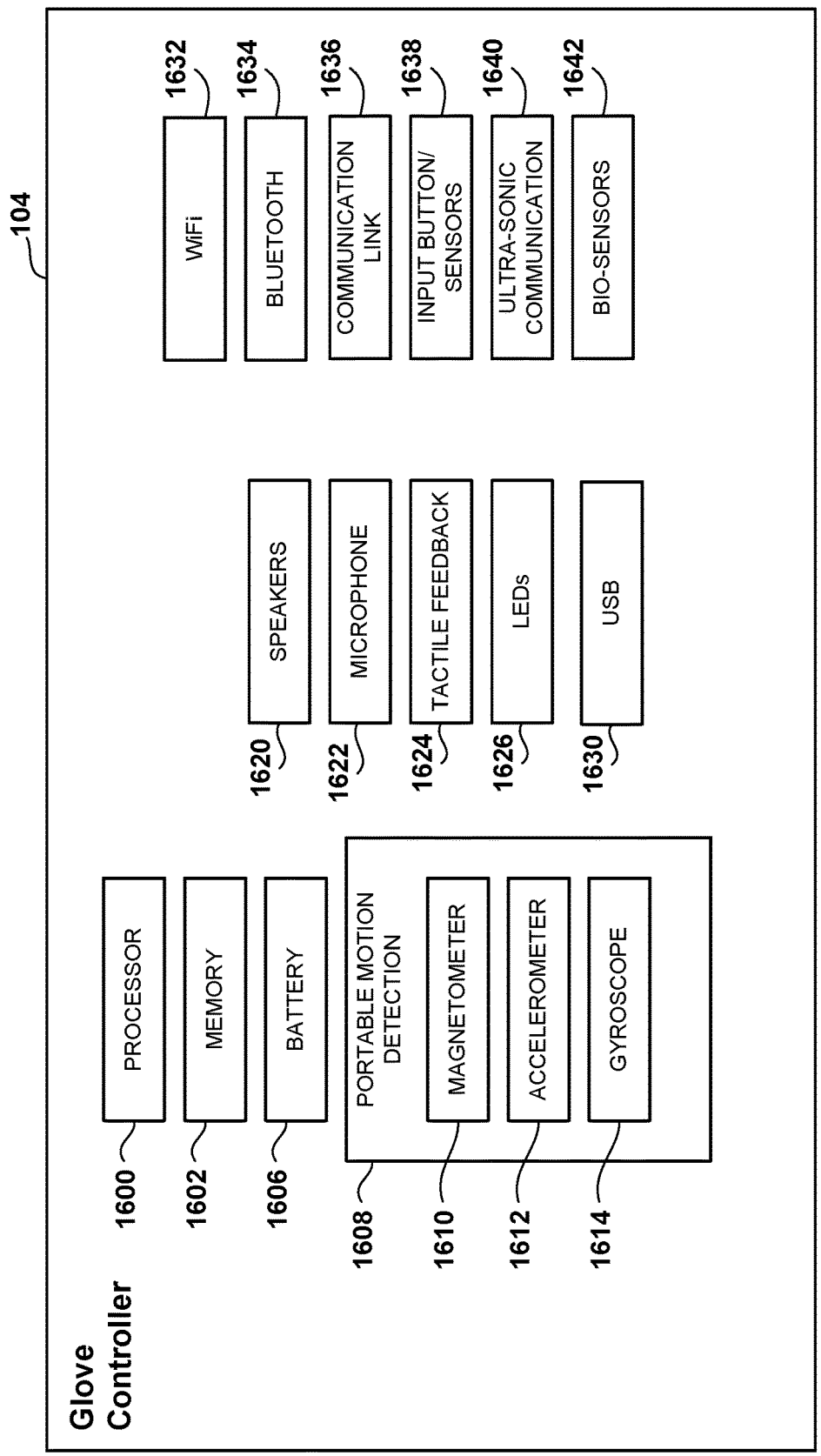
FIG. 16 illustrates components of a glove interface object, in accordance with an embodiment of the invention.

With reference to FIG. 16, a diagram illustrating components of a glove interface object 104 is shown, in accordance with an embodiment of the invention. The glove interface object 104 includes a processor 1600 for executing program instructions. A memory 1602 is provided for storage purposes, and may include both volatile and non-volatile memory. A battery 1606 is provided as a power source for the glove interface object 104. A motion detection module 1608 may include any of various kinds of motion sensitive hardware, such as a magnetometer 1610, an accelerometer 1612, and a gyroscope 1614.

The glove interface object 104 includes speakers 1620 for providing audio output. Also, a microphone 1622 may be included for capturing audio from the real environment, including sounds from the ambient environment, speech made by the user, etc. The glove interface object 104 includes tactile feedback module 1624 for providing tactile feedback to the user. In one embodiment, the tactile feedback module 1624 is capable of causing movement and/or vibration of the glove interface object 104 so as to provide tactile feedback to the user.

LEDs 1626 are provided as visual indicators of statuses of the glove interface object 104. For example, an LED may indicate battery level, power on, etc. A USB interface 1630 is included as one example of an interface for enabling connection of peripheral devices, or connection to other devices, such as other portable devices, computers, etc. In various embodiments of the glove interface object 104, any of various kinds of interfaces may be included to enable greater connectivity of the glove interface object 104.

A WiFi module 1632 is included for enabling connection to the Internet or a local area network via wireless networking technologies. Also, the glove interface object 104 includes a Bluetooth module 1634 for enabling wireless connection to other devices. A communications link 1636 may also be included for connection to other devices. In one embodiment, the communications link 1636 utilizes infrared transmission for wireless communication. In other embodiments, the communications link 1636 may utilize any of various wireless or wired transmission protocols for communication with other devices.

Input buttons/sensors 1638 are included to provide an input interface for the user. Any of various kinds of input interfaces may be included, such as buttons, touchpad, joystick, trackball, etc. An ultra-sonic communication module 1640 may be included in glove interface object 104 for facilitating communication with other devices via ultra-sonic technologies.

Bio-sensors 1642 are included to enable detection of physiological data from a user. In one embodiment, the bio-sensors 1642 include one or more dry electrodes for detecting bio-electric signals of the user through the user's skin.

The foregoing components of glove interface object 104 have been described as merely exemplary components that may be included in glove interface object 104. In various embodiments of the invention, the glove interface object 104 may or may not include some of the various aforementioned components. Embodiments of the glove interface object 104 may additionally include other components not presently described, but known in the art, for purposes of facilitating aspects of the present invention as herein described.

It will be appreciated by those skilled in the art that in various embodiments of the invention, the aforementioned glove interface object may be utilized in conjunction with an interactive application displayed on a display to provide various interactive functions. The exemplary embodiments described herein are provided by way of example only, and not by way of limitation.

Figure 17:
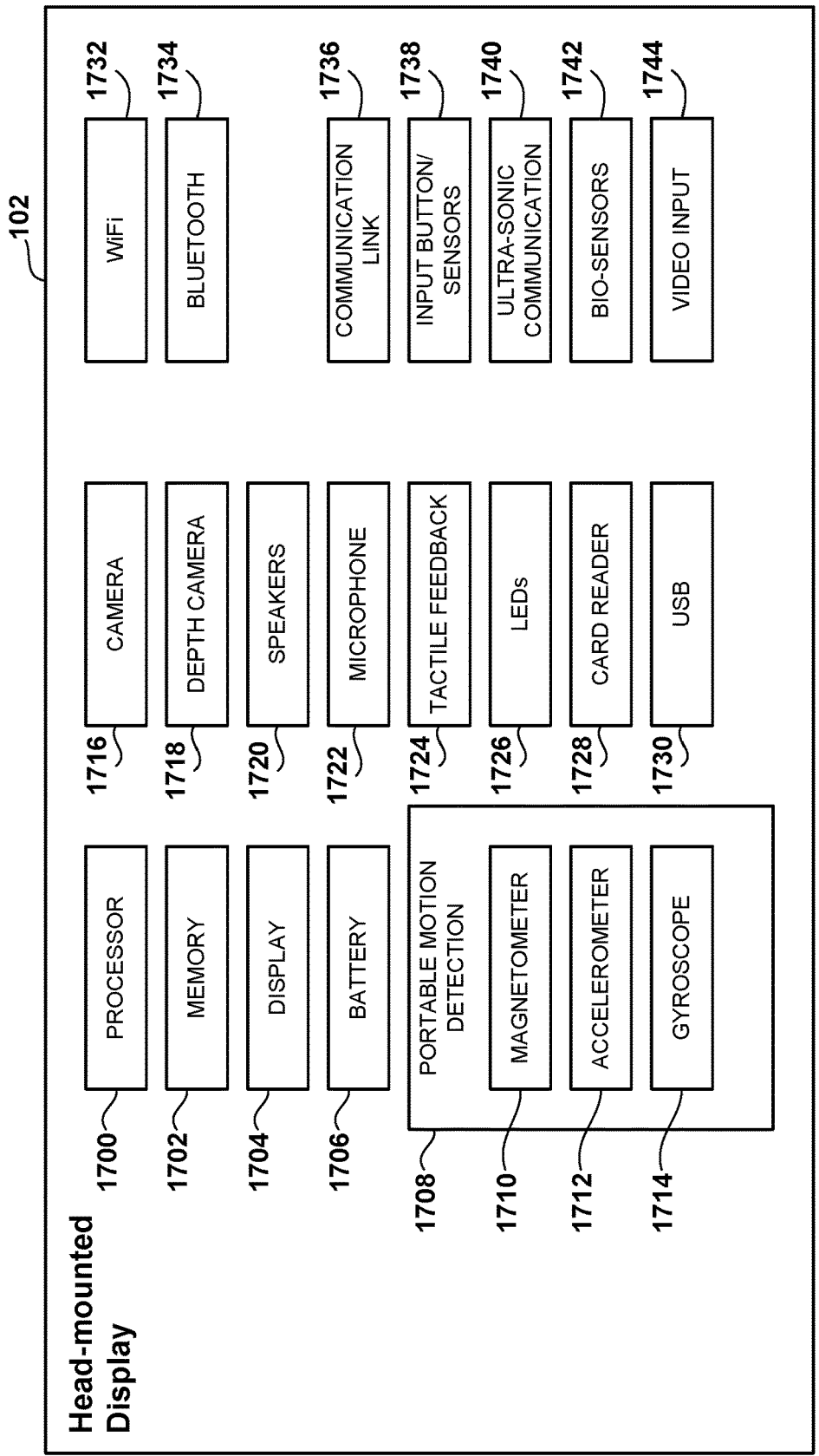
FIG. 17 illustrates components of a head-mounted display, in accordance with an embodiment of the invention.

With reference to FIG. 17, a diagram illustrating components of a head-mounted display 102 is shown, in accordance with an embodiment of the invention. The head-mounted display 102 includes a processor 1700 for executing program instructions. A memory 1702 is provided for storage purposes, and may include both volatile and non-volatile memory. A display 1704 is included which provides a visual interface that a user may view. A battery 1706 is provided as a power source for the head-mounted display 102. A motion detection module 1708 may include any of various kinds of motion sensitive hardware, such as a magnetometer 1710, an accelerometer 1712, and a gyroscope 1714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1712 is used together with magnetometer 1710 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1716 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1718 may be included in the head-mounted display 102 for sensing depth information of objects in a real environment.

The head-mounted display 102 includes speakers 1720 for providing audio output. Also, a microphone 1722 may be included for capturing audio from the real environment, including sounds from the ambient environment, speech made by the user, etc. The head-mounted display 102 includes tactile feedback module 1724 for providing tactile feedback to the user. In one embodiment, the tactile feedback module 1724 is capable of causing movement and/or vibration of the head-mounted display 102 so as to provide tactile feedback to the user.

LEDs 1726 are provided as visual indicators of statuses of the head-mounted display 102. For example, an LED may indicate battery level, power on, etc. A card reader 1728 is provided to enable the head-mounted display 102 to read and write information to and from a memory card. A USB interface 1730 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1732 is included for enabling connection to the Internet or a local area network via wireless networking technologies. Also, the head-mounted display 102 includes a Bluetooth module 1734 for enabling wireless connection to other devices. A communications link 1736 may also be included for connection to other devices. In one embodiment, the communications link 1736 utilizes infrared transmission for wireless communication. In other embodiments, the communications link 1736 may utilize any of various wireless or wired transmission protocols for communication with other devices.

Input buttons/sensors 1738 are included to provide an input interface for the user. Any of various kinds of input interfaces may be included, such as buttons, touchpad, joystick, trackball, etc. An ultra-sonic communication module 1740 may be included in head-mounted display 102 for facilitating communication with other devices via ultra-sonic technologies.

Bio-sensors 1742 are included to enable detection of physiological data from a user. In one embodiment, the bio-sensors 1742 include one or more dry electrodes for detecting bio-electric signals of the user through the user's skin.

A video input 1744 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

Figure 18A:
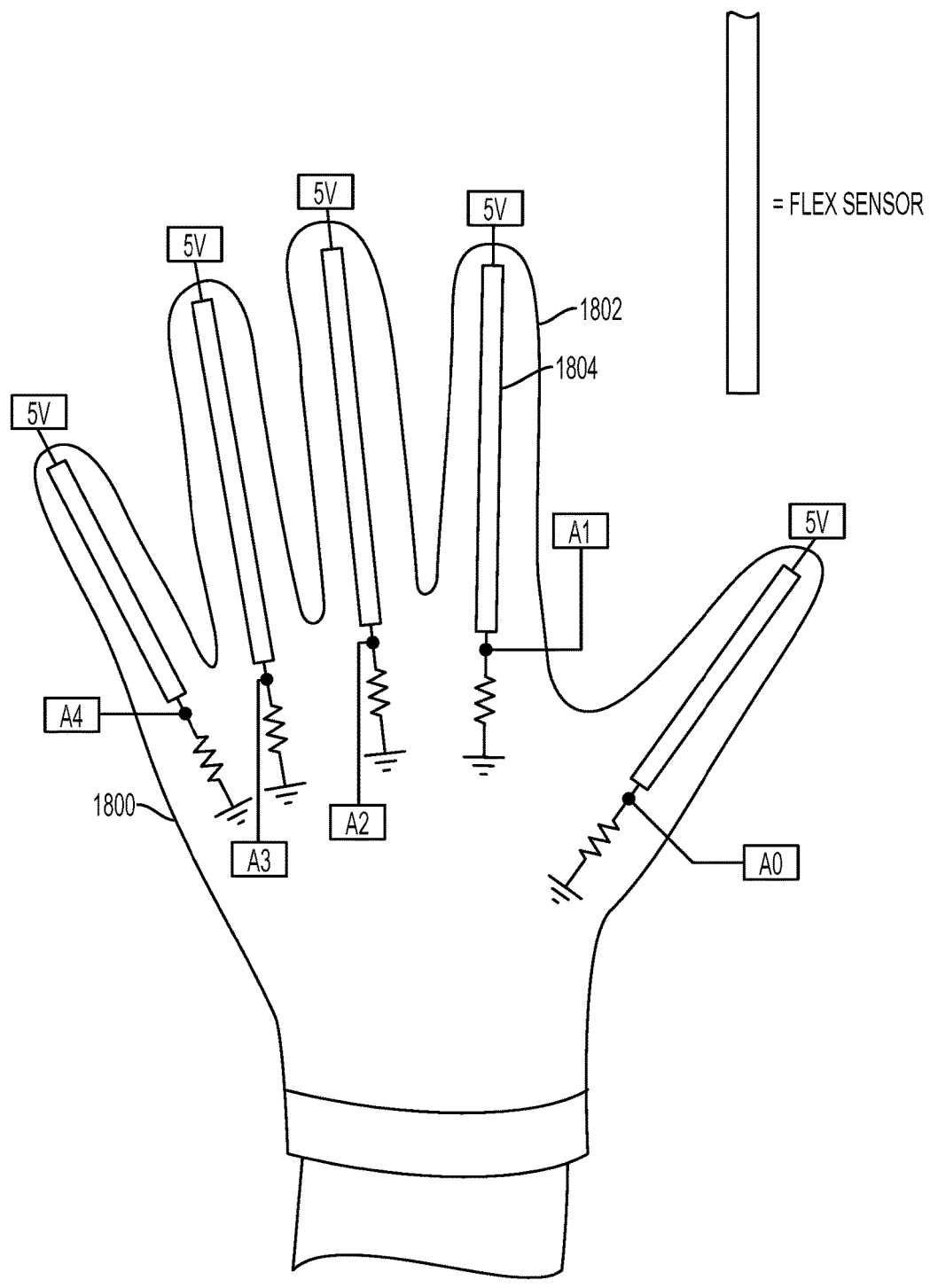
FIG. 18A illustrates a glove interface object incorporating a plurality of flex sensors, in accordance with an embodiment of the invention.

FIG. 18A illustrates a glove interface object incorporating a plurality of flex sensors, in accordance with an embodiment of the invention. FIG. 18A additionally schematically illustrates circuitry of the flex sensors, in accordance with an embodiment of the invention. As shown, the glove interface object 1800 includes a flex sensor that is defined along the top surface of each of the fingers of the glove interface object 1800. For example, the index finger 1802 includes a flex sensor 1804 that extends from the base of the index finger 1802, that is where the knuckle of the index finger would be present, to the tip of the index finger 1802. In the illustrated embodiment, the flex sensors are positioned along the top surface of each of the fingers of the glove interface object, which correlates to the top side of the user's fingers, i.e. the back of the user's hand (opposite the palm side of the user's hand). However, it will be appreciated that in other implementations the flex sensors can be positioned at other locations around the finger portions of the glove interface object, such as along the sides of the fingers or along the bottom of the fingers (i.e. the palm facing side of the fingers).

Each flex sensor is configured to detect flexion of a portion of the user's hand such as the user's fingers. In some embodiments, a flex sensor is defined to include a flex sensitive resistor, whose resistance changes based on the amount of flexion of the resistor. Examples of flex sensors are known in the art, and include those manufactured and/or sold by Spectra Symbol, etc. In some implementations, as the flexion of the flex sensitive resistor increases, the resistance of the resistor increases. With continued reference to FIG. 18A, each flex sensor is connected to a single analog input (A0-A5), yielding a total of five analog inputs. It will be appreciated that any type of flex sensor that is capable of detecting and/or quantifying flexion may be utilized for purposes of detecting flexion of a glove interface object.

Figure 18B:
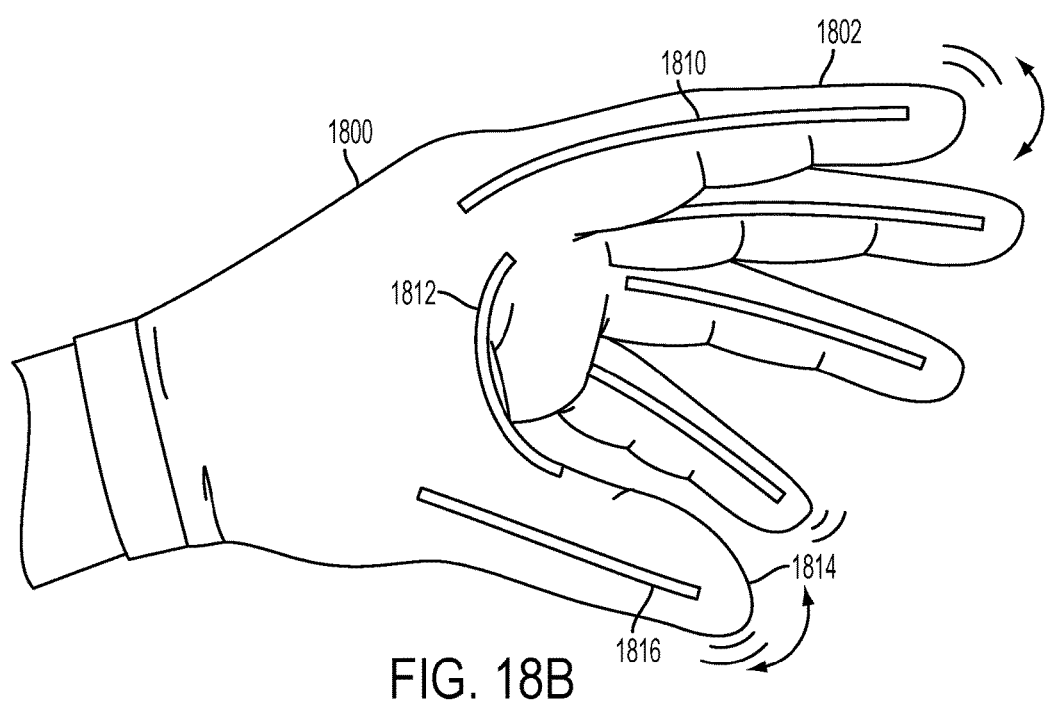
FIG. 18B illustrates a side view of a glove interface object having flex sensors defined thereon, in accordance with an embodiment of the invention.

FIG. 18B illustrates a side view of a glove interface object having flex sensors defined thereon, in accordance with an embodiment of the invention. In the illustrated embodiment, the index finger 1802 of the glove interface object 1800 has a flex sensor 1810 defined along a side surface of the index finger 1802. It may be advantageous to position flex sensors along side surfaces of the fingers of the glove interface object because the distance along the side of a given finger will not change as significantly as that of the top or bottom surface of the finger when it is flexed. Generally speaking, as the fingers are flexed (i.e. closed), the length along the top surface of the fingers increases, and the length along the bottom surface of the fingers decreases. Thus, when flex sensors are positioned along the top surface of the fingers, if they are substantially non-elastic, then the flex sensors may tend to pull back on the fingers, resisting their flexing.

FIG. 18B additionally illustrates a flex sensor 1816 positioned along the thumb portion of the glove interface object 1800. Also, a flex sensor 1812 is positioned along the portion of the glove interface object that is between the index finger and thumb, so as to detect the flexion or spread between the index finger and thumb.

Figure 18C:
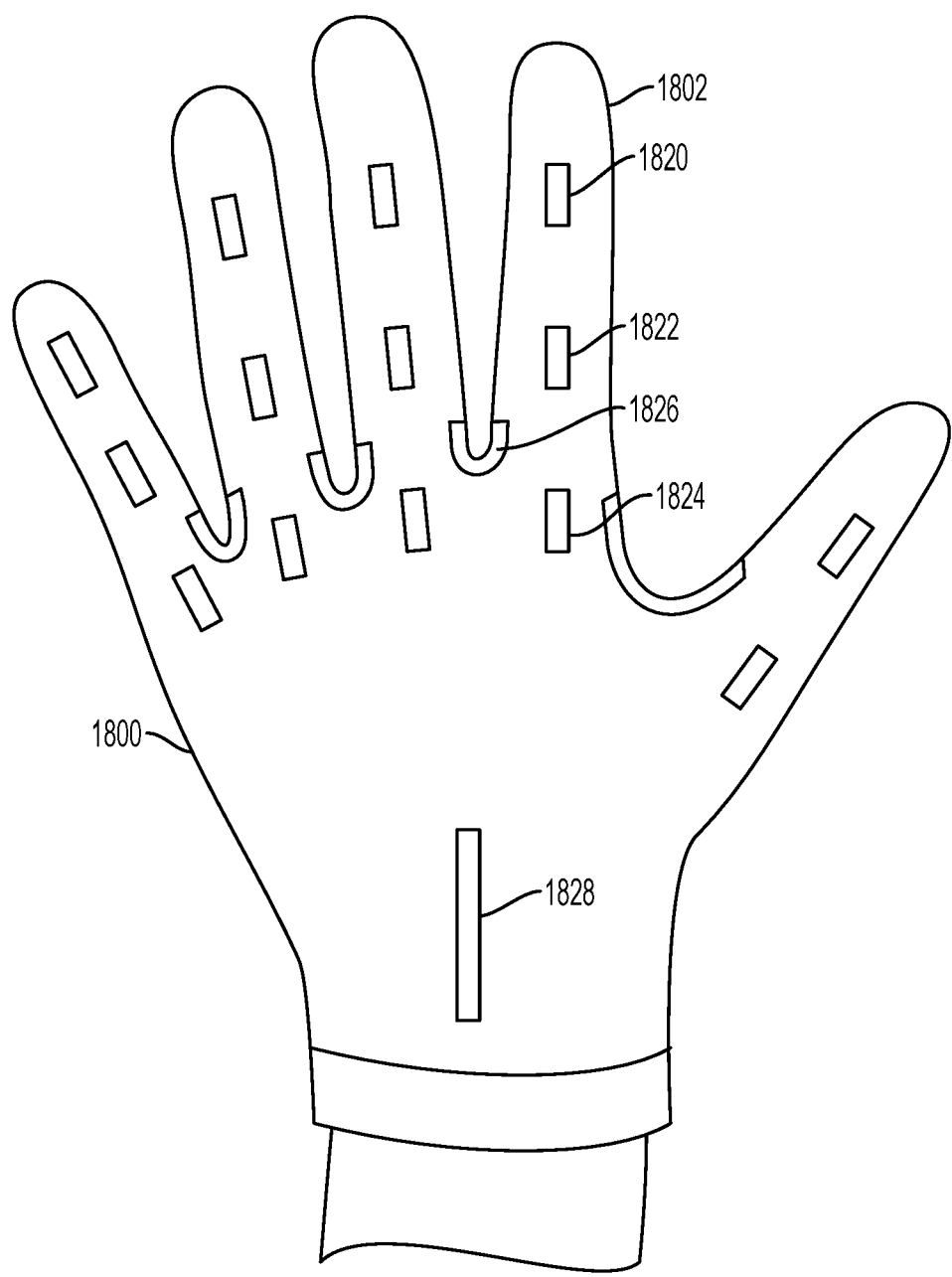
FIG. 18C illustrates a glove interface object having a plurality of flex sensors positioned at joint regions of the glove interface object, in accordance with an embodiment of the invention.

FIG. 18C illustrates a glove interface object having a plurality of flex sensors positioned at joint regions of the glove interface object, in accordance with an embodiment of the invention. In the illustrated embodiment, for example, the index finger portion 1802 of the glove interface object includes: a flex sensor 1820 positioned to detect flexion of the distal interphalangeal joint of the user's index finger, a flex sensor 1822 positioned to detect flexion of the proximal interphalangeal joint of the user's index finger, and a flex sensor 1824 positioned to detect flexion of the knuckle (metacarpal phalangeal joint) of the user's index finger. The other finger portions of the glove interface object 1800 include similarly positioned flex sensors to detect flexion of the various joints of the fingers of the user's hand.

Additionally, flex sensors are located between the finger portions of the glove interface object 1800, such as flex sensor 1826, which is positioned to detect flexion or spreading between the index finger and middle finger. In the illustrated embodiment, other flex sensors are similarly positioned between adjacent fingers to detect the spread between the adjacent fingers.

Furthermore, a flex sensor 1828 is positioned along a top wrist portion of the glove interface object 1800, so as to detect flexion of the user's wrist. In some embodiments, a flex sensor is positioned along a bottom wrist portion of the glove interface object. In some embodiments, additional flex sensors may be positioned along the sides of the wrist to detect sideways flexion of the wrist.

In some embodiments, a calibration procedure is provided for calibrating the flex sensors of the glove interface object. For example, the calibration procedure may entail having the user operate the glove interface object so that the flex sensors are positioned in their least flexed positions, and/or their most flexed positions. Flex sensor data may be read at these positions to define upper/lower bounds and/or ranges of the flex sensor data for each flex sensor.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A glove interface object, comprising:
   a plurality of fluid channels disposed on a palmar side of the glove interface object, the fluid channels containing a magnetic fluid, wherein the plurality of fluid channels includes at least one fluid channel defined on a finger portion of the glove interface object;
   a plurality of electromagnets positioned on the palmar side of the glove interface object, each of the plurality of electromagnets being configured when activated to generate a magnetic field that acts on at least a portion of the magnetic fluid, wherein the plurality of electromagnets includes at least one electromagnet defined on the finger portion of the glove interface object;
   a flex sensor defined on the finger portion of the glove interface object, the flex sensor configured to detect flexion of the finger portion, wherein the flexion is defined from bending of a joint of a hand of a user;
   a controller configured to control activation and deactivation of the electromagnets based on received haptic feedback data, the haptic feedback data being generated based on the detected flexion of the finger portion and based on a virtual interaction of a virtual hand in a virtual environment, the haptic feedback data being configured to activate a portion of the electromagnets to resist the flexion of the finger portion, wherein resisting the flexion is configured to resist the bending of the joint of the hand of the user.

2. The glove interface object of claim 1, wherein the haptic feedback data is defined based on contact between a virtual hand and a virtual object in a virtual environment, wherein the haptic feedback data provides for activation of a portion of the electromagnets that are configured to attract a portion of the magnetic fluid, the portion of the magnetic fluid being positioned on a region of the glove interface object that corresponds to a region of the virtual hand that contacts the virtual object.

3. The glove interface object of claim 2, wherein the haptic feedback data provides for deactivation of a second portion of the electromagnets that are configured to attract a second portion of the magnetic fluid, the second portion of the magnetic fluid positioned on a region of the glove interface object that corresponds to a region of the virtual hand that does not contact the virtual object.

4. The glove interface object of claim 2, wherein the haptic feedback data defines a strength of activation of the portion of the electromagnets, wherein the strength of activation is correlated to a level of pressure exerted on the region of the virtual hand that contacts the virtual object.

5. The glove interface object of claim 2, wherein the virtual environment is generated from execution of an interactive application by a computing device, the interactive application further generating a view of the virtual environment that is rendered on a head-mounted display (HMD).

6. The glove interface object of claim 5, wherein the contact between the virtual hand and the virtual object is shown in the view of the virtual environment that is rendered on the HMD.

7. The glove interface object of claim 5, wherein movements of the virtual hand are controlled by detected movements of the glove interface object, wherein the interactive application generates the haptic feedback data based on the detected movements of the glove interface object.

8. The glove interface object of claim 1,
   wherein the plurality of fluid channels includes at least one fluid channel defined on at least one phalange segment of each finger portion of the glove interface object;
   wherein the plurality of electromagnets includes at least one electromagnet defined on at least one phalange segment of each finger portion of the glove interface object.

9. The glove interface object of claim 1, further comprising at least one sensor configured to generate data identifying a pose of at least a portion of the glove interface object.

10. A system, comprising:
    a computing device configured to execute an interactive application to generate a virtual environment that includes a virtual hand;
    a head-mounted display (HMD), the HMD configured to render a view of the virtual environment generated by the interactive application;
    a glove interface object, including,
    a plurality of fluid channels disposed on a palmar side of the glove interface object, the fluid channels containing a magnetic fluid, wherein the plurality of fluid channels includes at least one fluid channel defined on a finger portion of the glove interface object,
    a plurality of electromagnets positioned on the palmar side of the glove interface object, each of the plurality of electromagnets being configured when activated to generate a magnetic field that acts on at least a portion of the magnetic fluid, wherein the plurality of electromagnets includes at least one electromagnet defined on the finger portion of the glove interface object,
    a flex sensor defined on the finger portion of the glove interface object, the flex sensor configured to detect flexion of the finger portion, wherein the flexion is defined from bending of a joint of a hand of a user,
    a controller configured to control activation and deactivation of the electromagnets based on haptic feedback data received from the computing device, the haptic feedback data being generated based on the detected flexion of the finger portion and based on a virtual interaction of a virtual hand in a virtual environment, the haptic feedback data being configured to activate a portion of the electromagnets to resist the flexion of the finger portion, wherein resisting the flexion is configured to resist the bending of the joint of the hand of the user.

11. The system of claim 10, wherein the haptic feedback data is defined based on contact between the virtual hand and a virtual object in the virtual environment, wherein the haptic feedback data provides for activation of a portion of the electromagnets that are configured to attract a portion of the magnetic fluid, the portion of the magnetic fluid being positioned on a region of the glove interface object that corresponds to a region of the virtual hand that contacts the virtual object.

12. The system of claim 11, wherein the haptic feedback data provides for deactivation of a second portion of the electromagnets that are configured to attract a second portion of the magnetic fluid, the second portion of the magnetic fluid positioned on a region of the glove interface object that corresponds to a region of the virtual hand that does not contact the virtual object.

13. The system of claim 11, wherein the haptic feedback data defines a strength of activation of the portion of the electromagnets, wherein the strength of activation is correlated to a level of pressure exerted on the region of the virtual hand that contacts the virtual object.

14. The system of claim 11, wherein the contact between the virtual hand and the virtual object is shown in the view of the virtual environment that is rendered on the HMD.

15. The system of claim 10, wherein movements of the virtual hand are controlled by detected movements of the glove interface object, wherein the interactive application generates the haptic feedback data based on the detected movements of the glove interface object.

16. The system of claim 10,
wherein the plurality of fluid channels includes at least one fluid channel defined on at least one phalange segment of each finger portion of the glove interface object;
wherein the plurality of electromagnets includes at least one electromagnet defined on at least one phalange segment of each finger portion of the glove interface object.

17. The system of claim 10, wherein the glove interface object further includes at least one sensor configured to generate data identifying a pose of at least a portion of the glove interface object.

* * * * *